(12) United States Patent
Hirayama

(10) Patent No.: US 11,270,862 B2
(45) Date of Patent: Mar. 8, 2022

(54) ROTATIONAL OPERATION UNIT AND ELECTRONIC APPARATUS

(71) Applicant: CANON KABUSHIKI KAISHA, Tokyo (JP)

(72) Inventor: Keita Hirayama, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 337 days.

(21) Appl. No.: 16/299,369

(22) Filed: Mar. 12, 2019

(65) Prior Publication Data

US 2019/0287752 A1 Sep. 19, 2019

(30) Foreign Application Priority Data

Mar. 14, 2018 (JP) .............................. JP2018-046686

(51) Int. Cl.
| | |
|---|---|
| *H01F 7/00* | (2006.01) |
| *H01H 89/00* | (2006.01) |
| *H01H 25/06* | (2006.01) |
| *G03B 17/02* | (2021.01) |
| *H01H 36/00* | (2006.01) |

(52) U.S. Cl.
CPC ............. *H01H 89/00* (2013.01); *G03B 17/02* (2013.01); *H01H 25/065* (2013.01); *H01H 36/004* (2013.01); *G03B 2217/002* (2013.01); *H01H 2215/00* (2013.01); *H01H 2231/046* (2013.01)

(58) Field of Classification Search
CPC .... H01H 89/00; H01H 25/065; H01H 36/004; H01H 2231/046; H01H 2215/00; H01H 19/11; G03B 17/02; G03B 2217/002; G01C 1/00; G01D 1/00; G01B 1/00; G01B 2210/00; G01R 1/00; G01P 1/00
USPC ....................................................... 335/209
See application file for complete search history.

(56) References Cited

U.S. PATENT DOCUMENTS

| | | | | |
|---|---|---|---|---|
| 6,233,406 B1* | 5/2001 | Iwamoto | ............... | G03B 1/62 396/284 |
| 6,321,042 B1* | 11/2001 | Iwamoto | ............... | G03B 1/06 396/392 |
| 6,341,202 B1* | 1/2002 | Hosokawa | ........... | G03B 17/00 396/281 |
| 6,427,051 B1* | 7/2002 | Hosokawa | ........... | G03B 15/05 396/165 |
| 2002/0025147 A1* | 2/2002 | Konishi | .............. | G03B 17/00 396/72 |
| 2002/0057908 A1* | 5/2002 | Otani | .................. | G03B 13/02 396/51 |

(Continued)

FOREIGN PATENT DOCUMENTS

JP 2013-073726 A 4/2013

*Primary Examiner* — Shawki S Ismail
*Assistant Examiner* — Lisa N Homza
(74) *Attorney, Agent, or Firm* — Cowan, Liebowitz & Latman, P.C.

(57) ABSTRACT

A rotational operation unit includes a rotational operation member that is rotatable, an annular magnet configured to integrally rotate with the rotational operation member, and a magnet holding member configured to rotatably hold the magnet and including an undulated portion configured to generate a click sense as the rotational operation member rotates. The magnet includes a positioner configured to determine a position relative to the magnet holding member.

10 Claims, 20 Drawing Sheets

(56) References Cited

U.S. PATENT DOCUMENTS

| | | | |
|---|---|---|---|
| 2004/0022532 A1* | 2/2004 | Nakamura | G02B 7/102 396/125 |
| 2004/0042089 A1* | 3/2004 | Nomura | G02B 15/02 359/819 |
| 2004/0042091 A1* | 3/2004 | Nomura | G02B 7/022 359/819 |
| 2004/0042092 A1* | 3/2004 | Nomura | G02B 7/08 359/819 |
| 2004/0042093 A1* | 3/2004 | Nomura | G02B 7/026 359/819 |
| 2004/0042095 A1* | 3/2004 | Nomura | G02B 7/022 359/822 |
| 2004/0042096 A1* | 3/2004 | Nomura | G02B 7/08 359/822 |
| 2004/0042775 A1* | 3/2004 | Nomura | G02B 7/08 396/73 |
| 2004/0051967 A1* | 3/2004 | Nomura | G02B 15/143 359/701 |
| 2004/0051968 A1* | 3/2004 | Nomura | G02B 7/08 359/701 |
| 2004/0051969 A1* | 3/2004 | Nomura | G02B 7/026 359/701 |
| 2004/0051970 A1* | 3/2004 | Nomura | G02B 7/08 359/701 |
| 2004/0051972 A1* | 3/2004 | Nomura | G02B 7/102 359/701 |
| 2004/0062536 A1* | 4/2004 | Nomura | G02B 7/026 396/72 |
| 2004/0076418 A1* | 4/2004 | Nomura | G02B 7/102 396/72 |
| 2004/0091253 A1* | 5/2004 | Nomura | G02B 7/026 396/72 |
| 2004/0119841 A1* | 6/2004 | Shimizu | H04N 1/0044 348/222.1 |
| 2004/0141736 A1* | 7/2004 | Nomura | G02B 15/143 396/72 |
| 2004/0141737 A1* | 7/2004 | Nomura | G02B 7/08 396/349 |
| 2004/0151490 A1* | 8/2004 | Nomura | G02B 7/026 396/349 |
| 2005/0134976 A1* | 6/2005 | Yano | G02B 7/08 359/824 |
| 2008/0156509 A1* | 7/2008 | Ikeo | G11B 31/006 174/50 |
| 2009/0103911 A1* | 4/2009 | Ikemizo | G03B 15/05 396/174 |
| 2009/0168353 A1* | 7/2009 | Kato | H04N 5/2252 361/697 |
| 2013/0148007 A1* | 6/2013 | Toyama | G03B 13/36 348/345 |
| 2013/0242174 A1* | 9/2013 | Lim | G03B 3/10 348/357 |
| 2015/0221426 A1* | 8/2015 | Furuki | G06F 3/0362 335/219 |
| 2015/0221461 A1* | 8/2015 | Man | H01H 19/11 200/564 |
| 2017/0126942 A1* | 5/2017 | Yamamoto | H04N 5/2253 |
| 2017/0347034 A1* | 11/2017 | Iwasaki | H04N 5/23245 |
| 2018/0020163 A1* | 1/2018 | Nishihara | H04N 5/23248 |
| 2018/0115718 A1* | 4/2018 | Nakamura | H04N 5/335 |
| 2019/0072412 A1* | 3/2019 | Fuchigami | H01H 19/11 |
| 2019/0287752 A1* | 9/2019 | Hirayama | H01H 89/00 |
| 2019/0394403 A1* | 12/2019 | Osada | H05K 5/0226 |
| 2020/0030857 A1* | 1/2020 | Hirayama | B08B 5/02 |
| 2020/0096725 A1* | 3/2020 | Nakashima | G01D 5/34715 |
| 2020/0168378 A1* | 5/2020 | Nagatsu | H01F 7/17 |
| 2020/0209908 A1* | 7/2020 | Arita | G06F 3/0362 |
| 2020/0265981 A1* | 8/2020 | Mizutani | H04N 5/23216 |
| 2021/0088879 A1* | 3/2021 | Nakamura | H04N 1/00384 |

\* cited by examiner

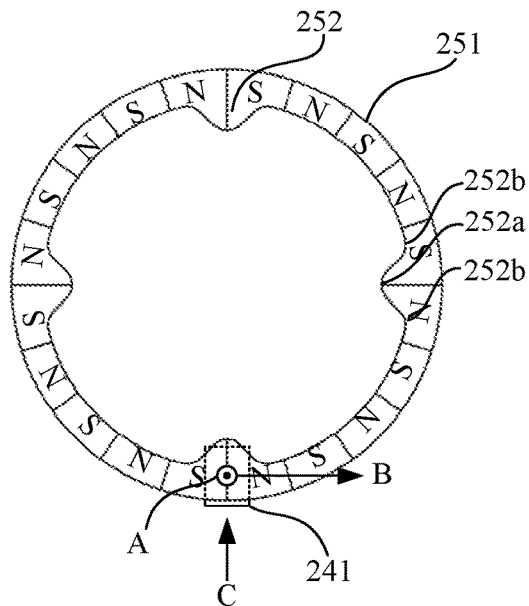
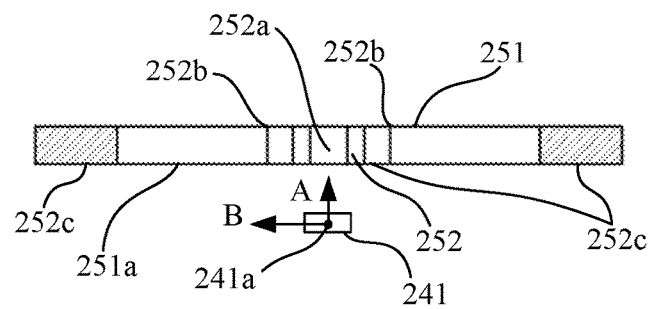
FIG. 11A          FIG. 11B
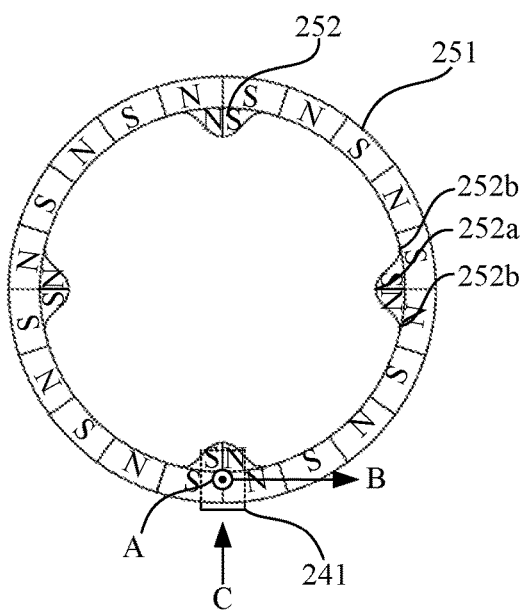
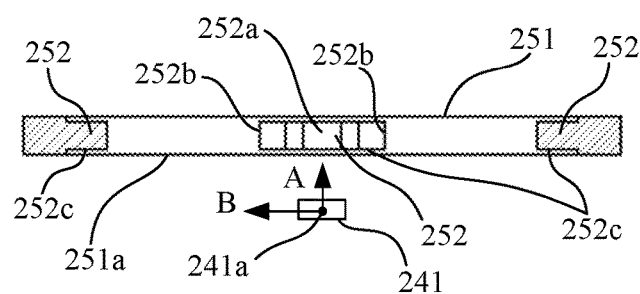
FIG. 11C          FIG. 11D

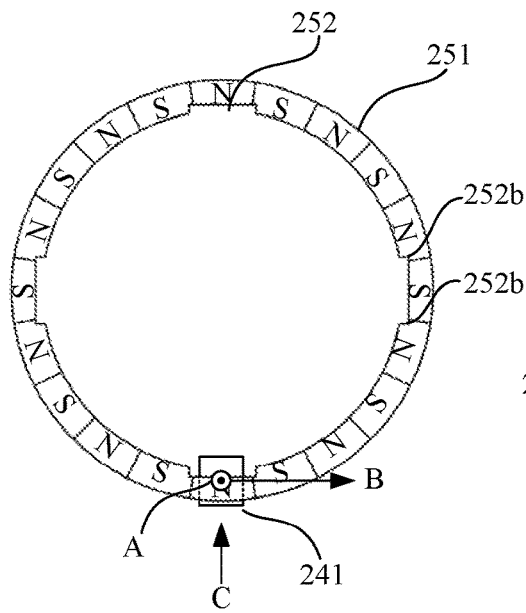 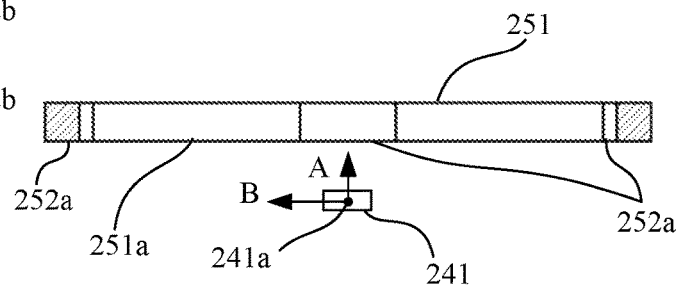
FIG. 12A  FIG. 12B
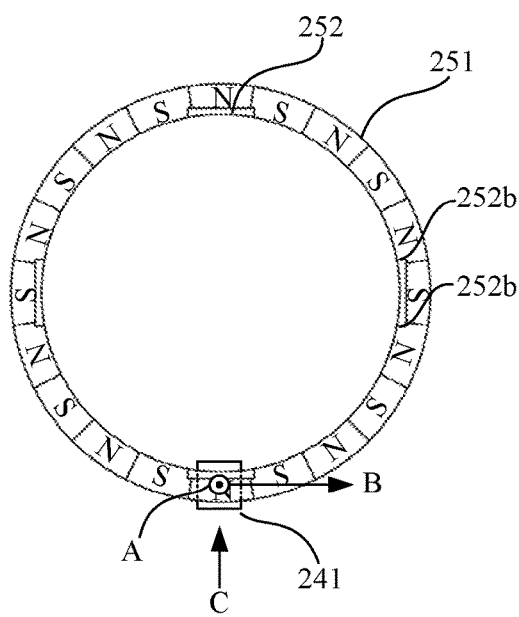 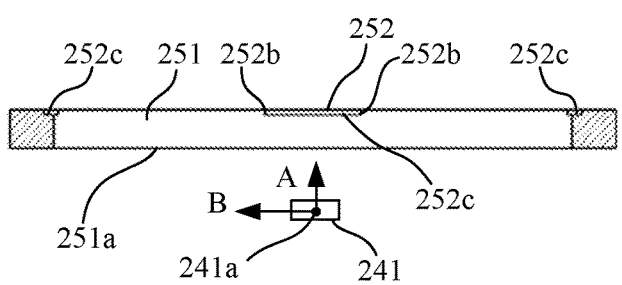
FIG. 12C  FIG. 12D

ROTATIONAL OPERATION UNIT AND ELECTRONIC APPARATUS

BACKGROUND OF THE INVENTION

Field of the Invention

The present invention relates to a rotational operation unit and an electronic apparatus having a rotational operation member through which a user provides a rotational operation.

Description of the Related Art

In an imaging apparatus, such as a digital camera, a user can set an imaging condition and a select a function by rotating a rotational operation member (or rotary member), such as a dial. One of the conventional methods for detecting a rotation of the rotational operation member is a method for detecting the rotation of the rotational operation member using a magnetic sensor. For example, Japanese Patent Laid-Open No. ("JP") 2013-073726 discloses a rotational operation unit that detects a rotation direction and a rotation amount using a ring-shaped rotary magnet which is configured to rotate integrally with a rotational operation member and has alternately magnetized S and N poles in the circumferential direction and a GMR sensor. The rotational operation unit disclosed in JP 2013-073726 can generate a click sense by the magnetic forces of the rotary magnet and the fixed magnet when the user operates the rotational operation member.

However, the rotational operation unit disclosed in JP 2013-073726 cannot determine a rotational phase of each of the GMR sensor, the rotary magnet, and the fixed magnet, and thus the phase of the rotational operation member may shift from the phase of the rotary magnet. As a result, the timing of the click sense generated by the rotational operation member may shift from the detection timing of the rotation direction and the rotation amount.

SUMMARY OF THE INVENTION

The present invention provides a reliable rotational operation unit and electronic apparatus by reducing a difference between the timing of the click sense generated by the rotational operation member and the detection timing of the rotation direction and the rotation amount.

A rotational operation unit according to one aspect of the present invention includes a rotational operation member that is rotatable, an annular magnet configured to integrally rotate with the rotational operation member, and a magnet holding member configured to rotatably hold the magnet and including an undulated portion configured to generate a click sense as the rotational operation member rotates. The magnet includes a positioner configured to determine a position relative to the magnet holding member.

An electronic apparatus according to another aspect of the present invention includes the above rotational operation unit.

Further features of the present invention will become apparent from the following description of exemplary embodiments with reference to the attached drawings.

BRIEF DESCRIPTION OF THE DRAWINGS

FIGS. 11A to 11D illustrate a relationship between the magnet and the Hall IC according to the first embodiment.

FIGS. 12A to 12D illustrate a relationship between the magnet and the Hall IC according to the first embodiment.

DESCRIPTION OF THE EMBODIMENTS

Referring now to the accompanying drawings, a description will be given of embodiments according to the present invention.

First Embodiment

Figure 1A:
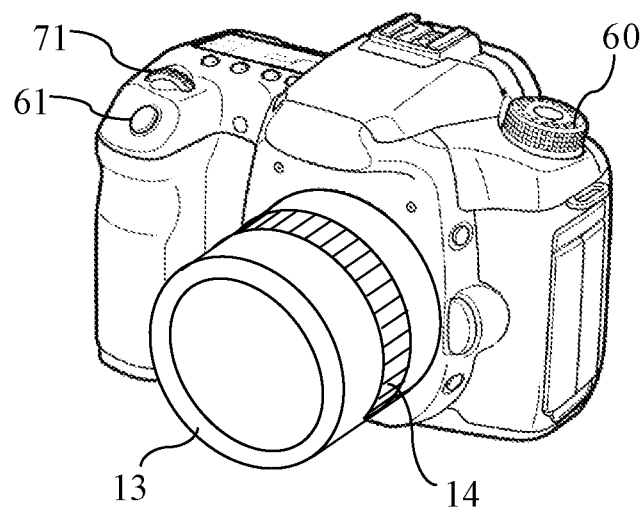
FIGS. 1A and 1B are overviews of an electronic apparatus according to each embodiment.
Figure 1B:
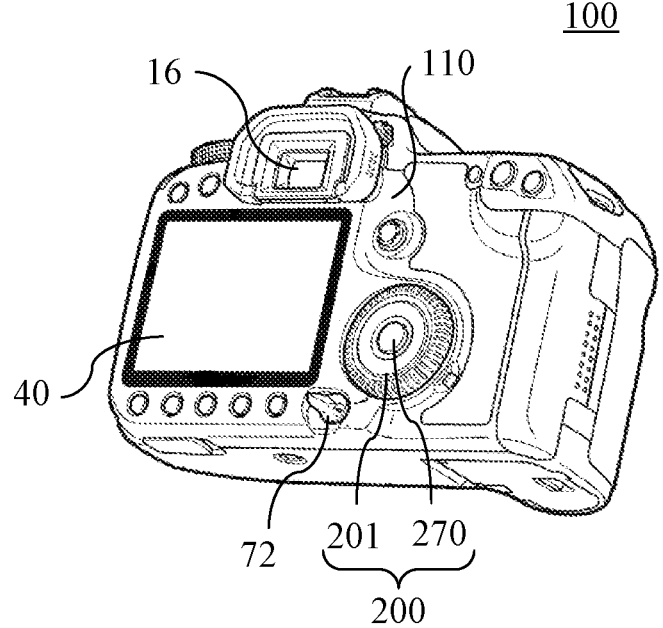
Figure 2:
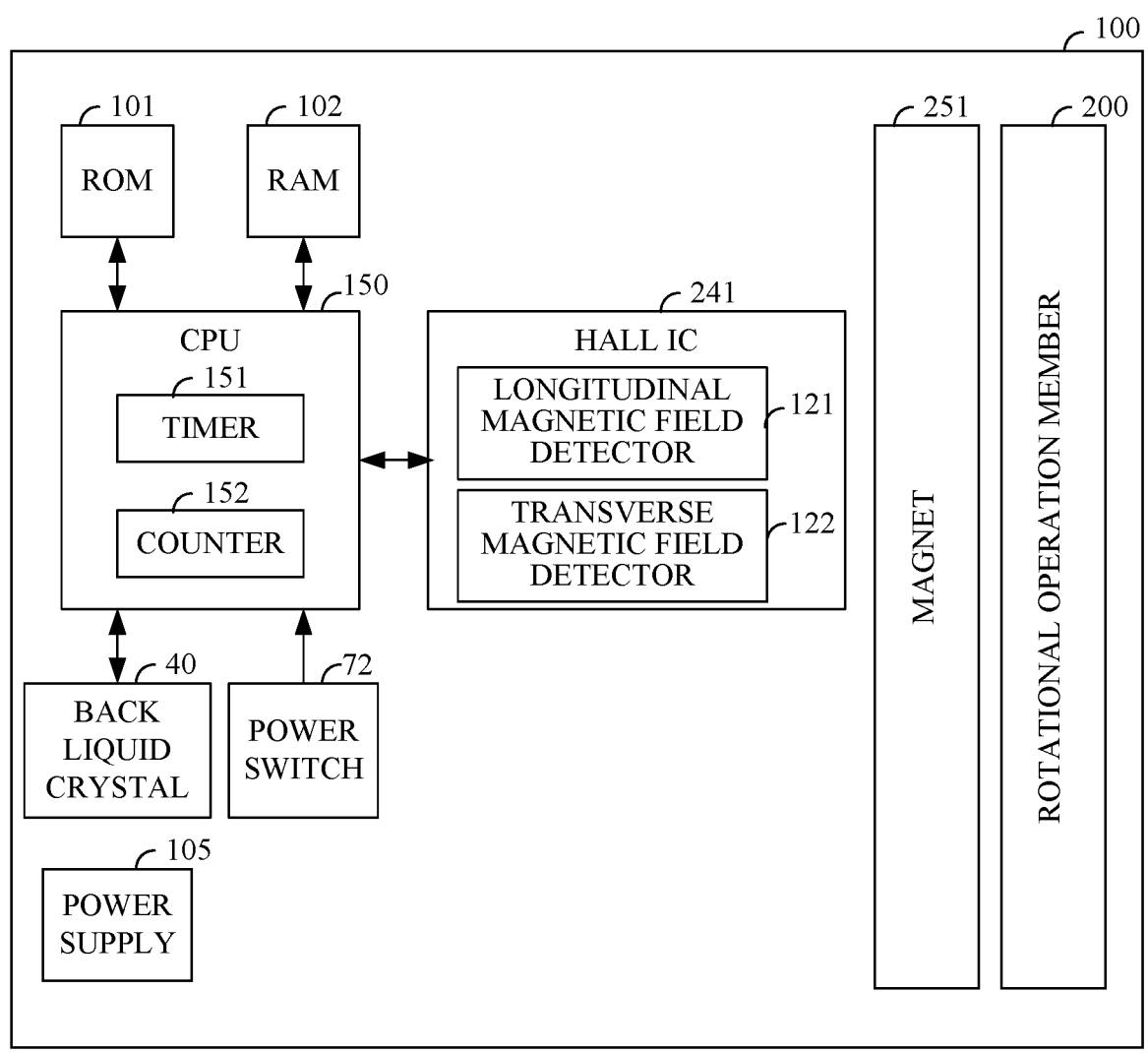
FIG. 2 is a block diagram of the electronic apparatus according to each embodiment.

Referring now to FIGS. 1A, 1B, and 2, a description will be given of an electronic apparatus according to a first embodiment of the present invention. The electronic apparatus according to this embodiment includes a rotational operation member rotatable by a user. This embodiment discusses an illustrative imaging apparatus as an electronic apparatus, but the present invention is not limited to this embodiment and is applicable to other electronic apparatuses.

FIGS. 1A and 1B are overviews of an imaging apparatus 100 according to this embodiment. FIG. 1A is a front perspective view of the imaging apparatus 100, and FIG. 1B is a rear perspective view of the imaging apparatus 100. A shutter button 61 is an operation unit for instructing imaging. A mode switch 60 is an operation unit for switching a variety of modes. A dial 71 is a rotational operation member (or a rotary member). The user turns the dial 71 to change a variety of set values such as a shutter speed and a diaphragm. A power switch 72 is an operation unit for powering on and off the imaging apparatus 100. A liquid crystal screen 40 is a display unit using a TFT liquid crystal or an organic EL, and displays a variety of set images and captured images of the imaging apparatus 100.

A rotational operation unit 200 includes a rotational operation member 201 and a pushbutton 270. The rotational operation member 201 is a dial-shaped operation member unlimitedly rotatable both in the clockwise and counterclockwise directions (circumferential direction or rotation direction) and used for a variety of operations, such as selecting an imaging mode, selecting a focus detecting point, selecting an image reproduction, and operating a menu. The user can move a selection frame, feed an image, and the like by rotating the rotational operation member 201. The pushbutton 270 is a button to be pressed, and is mainly used to finalize the selected item or the like.

An imaging lens 13 is a lens unit (lens apparatus) including a focus lens, a zoom lens, and the like, and detachable from the camera body. However, this embodiment is not limited to this example, and the imaging lens 13 may be integrated with the camera body. The user can rotate a focus ring 14 to move the focus lens in an optical axis direction for focusing. An eyepiece viewfinder 16 is a viewfinder that enables the user to confirm the focus and composition of the optical image of an object formed through the imaging lens 13 by observing an unillustrated focusing screen. Reference numeral 110 denotes a back cover of the imaging apparatus 100.

FIG. 2 is a block diagram of the imaging apparatus 100. A ROM (nonvolatile memory) 101 stores a program to be executed by a CPU 150 described later. In this embodiment, the ROM 101 includes a Flash-ROM, but may use another memory as long as it is a nonvolatile memory. A RAM 102 serves to temporarily store an image buffer captured by the imaging apparatus 100 and processed image data and serves as a work memory for the CPU 150. The RAM 102 in this embodiment has these functions, but may use another memory as long as it has a sufficient access speed.

A power supply unit 105 is a power supply unit of the imaging apparatus 100. The power supply unit 105 includes a battery, an AC adapter, and the like, and supplies the power to each component in the imaging apparatus 100 directly or via a DC-DC converter (not illustrated) or the like. A power switch 72 is a power operation unit provided in the imaging apparatus 100. The power switch 72 in this embodiment is configured to mechanically switch a power-on position and a power-off position, as illustrated in FIGS. 1A and 1B. The power switch 72 is not limited to this structure, and may be a push switch or an electrical switch. When the power switch 72 is turned off, the imaging apparatus 100 does not operate even when the power supply unit 105 is inserted into the imaging apparatus 100, and the imaging apparatus 100 maintains the low power consumption state. On the other hand, when the power switch 72 is turned on and the power supply unit 105 is inserted into the imaging apparatus 100, the imaging apparatus 100 is activated.

The CPU 150 is a controller that totally controls the imaging apparatus 100, and implements an imaging function as a basic function for the imaging apparatus 100. The CPU 150 switches a mode for the imaging apparatus 100, updates the display of the liquid crystal screen (display unit) 40, and the like in accordance with a detection result of the rotational operation member 201 by a detection method using a Hall IC 241 described below.

A timer 151 has a timer function that can measure an arbitrary time. In FIG. 2, the timer 151 is incorporated into the CPU 150, but the present invention is not limited to this example and the timer 151 may be attached from the outside. The timer 151 starts measuring the time and ends measuring the time in accordance with the instruction of the CPU 150. The timer 151 always operates and serves to instruct the CPU 150 to generate an interrupt periodically at predetermined time intervals. A counter 152 has a counter function for counting the number of operations of the rotational operation member 201. In FIG. 2, the counter 152 is incorporated into the CPU 150, but the present invention is not limited to this example and the counter 152 may be attached from the outside. In FIG. 2, the counter 152 counts the number of operations of the rotational operation member 201, but may count the number of operations of an arbitrary operation unit.

The Hall IC (magnetic field detector) 241 is a magnetic sensor including a longitudinal magnetic field detector (first magnetic field detector) 121 and a transverse magnetic field detector (second magnetic field detector) 122. The longitudinal magnetic field detector 121 detects a magnetic field (longitudinal magnetic field) in a predetermined direction (first direction). The transverse magnetic field detector 122 detects a magnetic field (transverse magnetic field) in a direction (second direction) perpendicular to (or different from) the predetermined direction. In FIG. 2, the Hall IC 241 is attached to the CPU 150 from the outside, but the present invention is not limited to this example and a Hall IC may be incorporated into the CPU 150. Arbitrary upper and lower threshold values are respectively set to the transverse magnetic field detecting portion 122 and the longitudinal magnetic field detecting portion 121 in the Hall IC 241. When the magnetic flux density detected by the Hall IC 241 (the transverse magnetic field detector 122 and the longitudinal magnetic field detector 121) is larger or smaller than the threshold (upper threshold value or lower threshold value), the Hall IC 241 outputs a predetermined signal to the CPU 150. The CPU 150 can read the magnetic flux density detected by the transverse magnetic field detector 122 or the longitudinal magnetic field detector 121 at an arbitrary timing.

A magnet (magnetic field generating member) 251 is a ring-shaped permanent magnet, and the S and N poles are alternately magnetized at a constant pitch in the circumferential direction (rotation direction). The magnet 251 rotates integrally with the rotational operation member 201 although the details will be described later with reference to FIG. 3 and subsequent figures. The Hall IC 241 detects a change in the magnetic flux density (magnetic field). The CPU (calculator) 150 calculates the rotation direction and the rotation amount of the rotational operation member 201 (in accordance with the change amount of the magnetic field in the first direction and the change amount of the magnetic field in the second direction) as the magnetic flux density changes.

Figure 3:
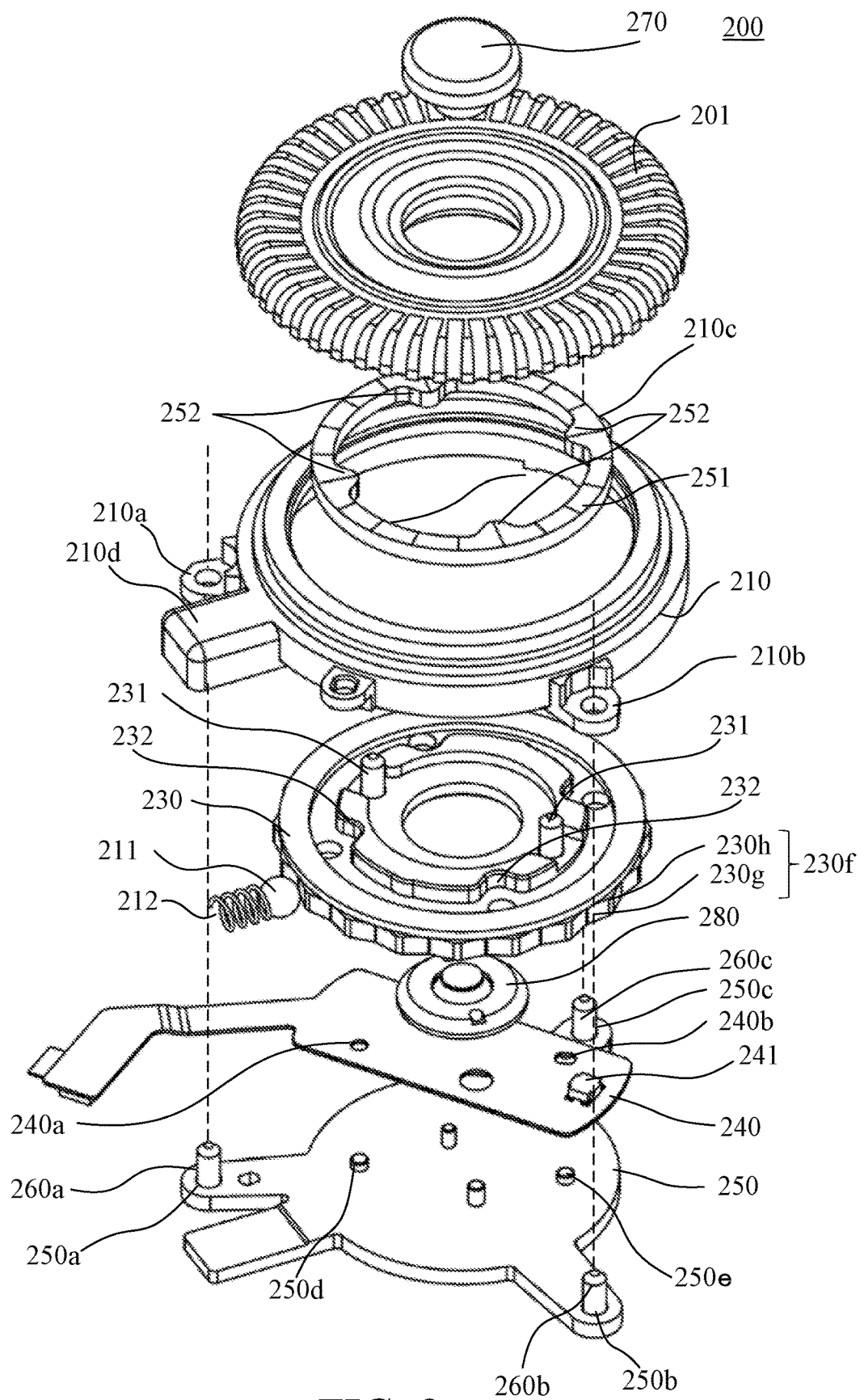
FIG. 3 is an exploded perspective view of a rotational operation unit according to a first embodiment.
Figure 4A:
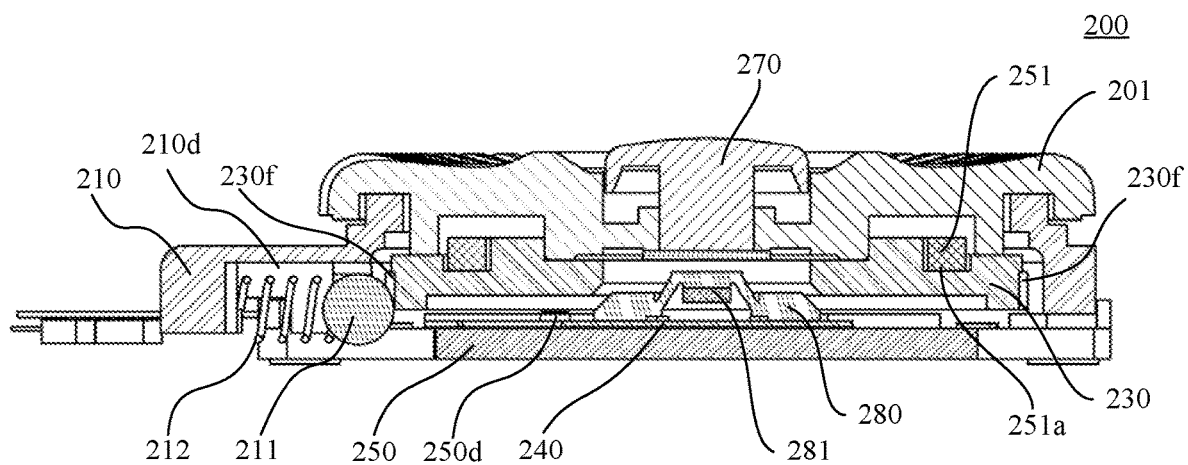
FIGS. 4A to 4C are sectional views of the rotational operation unit according to the first embodiment.
Figure 4B:
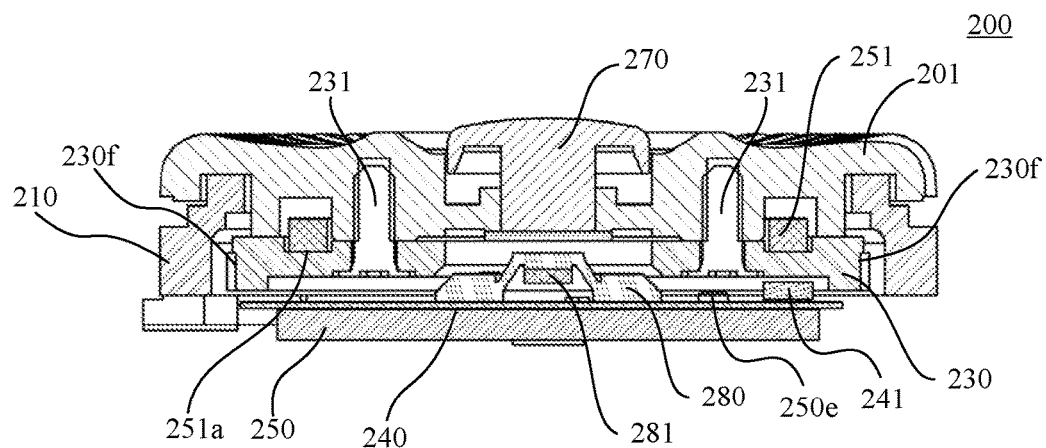
Figure 4C:
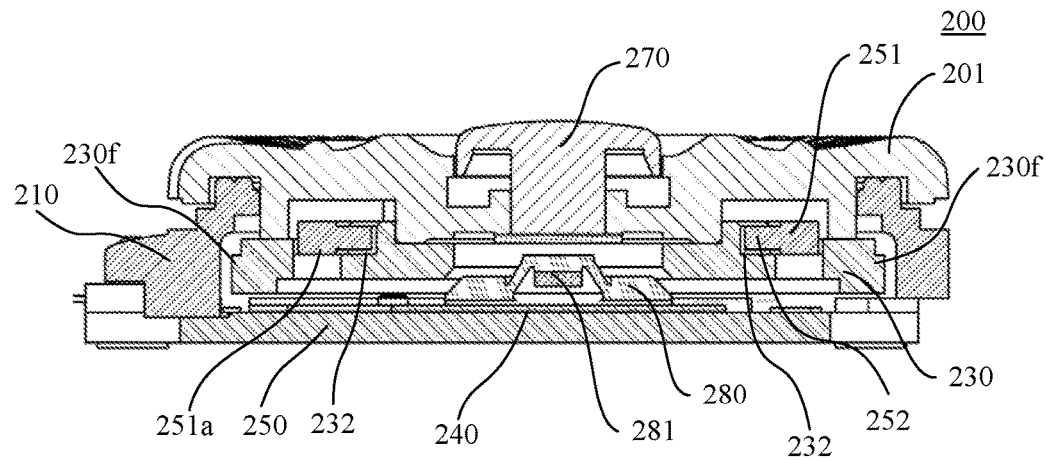
Figure 5:
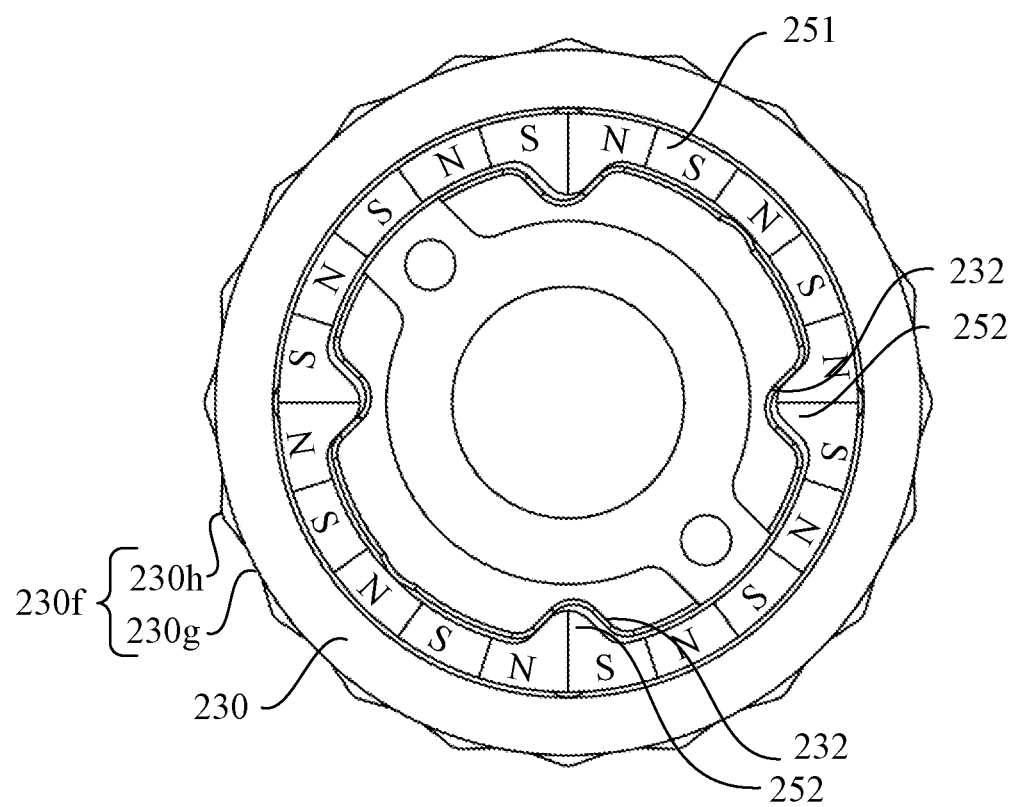
FIG. 5 is a top view of the magnet and the magnet holding member according to the first embodiment.

Referring now to FIGS. 3 to 5, a description will be given of a configuration in the rotational operation unit 200. FIG. 3 is an exploded perspective view of the rotational operation unit 200. FIGS. 4A to 4C are sectional views of the rotational operation unit 200. FIG. 4A illustrates a section passing the center of a ball member 211 to be described later, FIG. 4B illustrates a section passing the center of the Hall IC 241, and FIG. 4C illustrates a section passing the center of the positioner 252 described later. FIG. 5 is a top view of the magnet 251 and the magnet holding member 230 configured to maintain the magnet 251.

The rotational operation member 201 is an operation member for the user to perform a rotational operation in the clockwise direction or the counterclockwise direction. A base member 210 rotatably holds the rotational operation member 201. The base member 210 is fixed onto the back cover 110 (not illustrated in FIGS. 3 to 5) of the imaging apparatus 100 at three fixing portions 210a, 210b, and 210c.

A magnet holding member 230 is fixed onto the back surface of the rotational operation member 201 with screws 231. A positioning groove 232 for determining the position of the magnet 251 is formed in the magnet holding member 230. The magnet holding member 230 holds the magnet 251 rotatably and has an undulated portion 230f that provides a click sense as the rotational operation member 201 rotates.

In the magnet 251, the N and S poles are alternately polarized at regular pitches. The magnet 251 has a magnetized surface 251a on each of the N poles and the S poles, and a magnetic field is generated in a direction perpendicular to the magnetized surface 251a. The magnet 251 has a positioner (convex portion) 252 for determining the position relative to the magnet holding member 230. A plurality of positioners 252 are provided so as to protrude to the inside of the magnet 251. The detailed shape of the positioner 252 will be described later. The positioners 252 of the magnet 251 engaged with the positioning groove (groove portion) 232 in the magnet holding member 230 can position in the translation direction of a rotation axis and the rotation direction relative to the magnet holding member 230. This configuration rotates the magnet holding member 230 and the magnet 251 together as the rotational operation member 201 rotates.

The ball member 211 is held by a ball holding portion 210d of the base member 210 movably back and forth in a direction orthogonal to the rotation axis of the rotational operation member 201. A spring member 212 biases the ball member 211 against (in a direction contacting) the undulated portion 230f in the magnet holding member 230. In the undulated portion 230f, a concave portion 230g and a convex portion 230h are alternately formed at regular pitches. As the user rotates the rotational operation member 201, the ball member 211 moves back and forth along the undulated portion 230f in the ball holding portion 210d, providing the click sense.

The Hall IC (magnetic field detector) 241 can detect the intensities of magnetic fields (the longitudinal magnetic field and the transverse magnetic field described later) in two different directions. The Hall IC 241 is mounted on a substrate 240. The substrate 240 has substrate positioning holes 240a and 240b. The substrate positioning holes 240a and 240b are engaged with bosses 250d and 250e on a substrate fixing plate 250, respectively, so that the substrate 240 is positioned such that the Hall IC 241 faces the magnetized surface 251a of the magnet 251. Due to this configuration, the Hall IC 241 can detect the magnetic fields generated from the magnetized surface 251a of the magnet 251. The detection method will be described later.

The substrate fixing plate 250 has three attachment portions 250a, 250b, and 250c. The attachment portions 250a, 250b, and 250c are fastened and fixed onto the back cover 110 by screws 260a, 260b, and 260c together with the fixing portions 210a, 210b, and 210c of the base member 210.

As the rotational operation member 201 is operated, the magnet 251 integrally rotates and the magnetic field generated in the Hall IC 241 changes. Detecting this magnetic field change by the Hall IC 241 can detect the rotational motion of the rotational operation member 201.

The pushbutton 270 is used with the operation of the rotational operation member 201. For example, operating the rotational operation member 201 selects an operation menu and the selected operation menu is finalized by operating the pushbutton 270. The pushbutton 270 is held slidably in the rotation axis direction of the rotational operation member 201. When the pushbutton 270 is pushed, a switch rubber 280 is forced by the pushbutton 270 and a conductive portion 281 of the switch rubber 280 contacts an electrode pad provided in the substrate. Thereby, the operation of the pushbutton 270 can be detected.

Figure 6A:
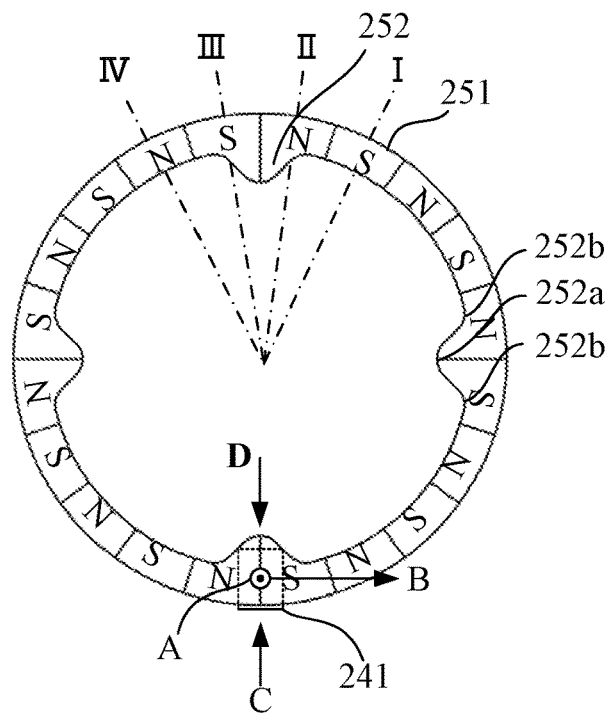
FIGS. 6A to 6F illustrate a relationship between a magnet and a Hall IC according to the first embodiment.
Figure 6B:
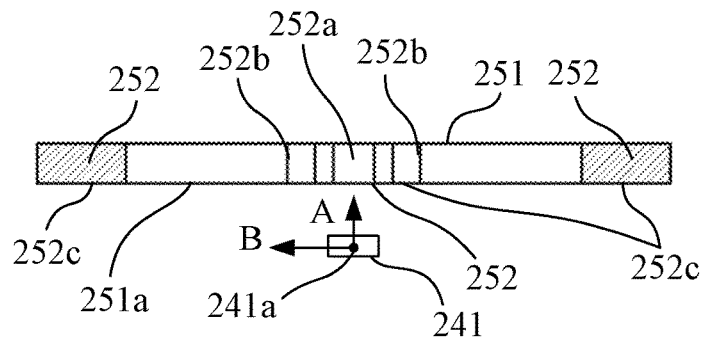

Referring now to FIGS. 6A to 6F, a description will be given of the magnetic field generated by the magnet 251 and the magnetic field detection by the Hall IC 241. FIGS. 6A to 6F illustrate the relationship between the magnet 251 and the Hall IC 241. FIG. 6A illustrates the magnet 251 and the Hall IC 241 viewed from the rotation axis direction of the rotational operation member 201 (the dial rotation axis direction). FIG. 6B is a sectional view of the magnet 251 and the Hall IC 241 viewed from the direction perpendicular to the rotation axis (an arrow D direction in FIG. 6A) where the magnet 251 rotates so that the positioner 252 can have the same phase as that of the Hall IC 241.

The magnet 251 is polarized into totally twenty poles of ten N poles and ten S poles arranged at regular pitches. The Hall IC 241 is disposed at a position facing the magnetized surface 251a of the magnet 251, and the center of the width of the magnet 251 and the detection portion 241a of the Hall IC 241 overlap each other on the arrow A. The positioner 252 inside the magnet 251 includes a vertex 252a and an end point 252b. The vertex 252a of the positioner 252 is located on the boundary between the S pole and the N pole of the magnet 251. At this time, the positioner 252 is polarized so as to coincide with the magnetic poles annularly polarized at regular pitches while the vertex 252a of the positioner 252 is set to the boundary.

The Hall IC 241 detects the magnetic flux density of the magnetic field in the central axis direction of the magnet 251 (an arrow A direction in FIG. 6B) and a tangential direction of the circle of the magnet 251 (the arrow B direction in FIG. 6B), and outputs a predetermined signal representing the state of each magnetic field. The details of the output signal of the Hall IC 241 will be described later.

Figure 6C:
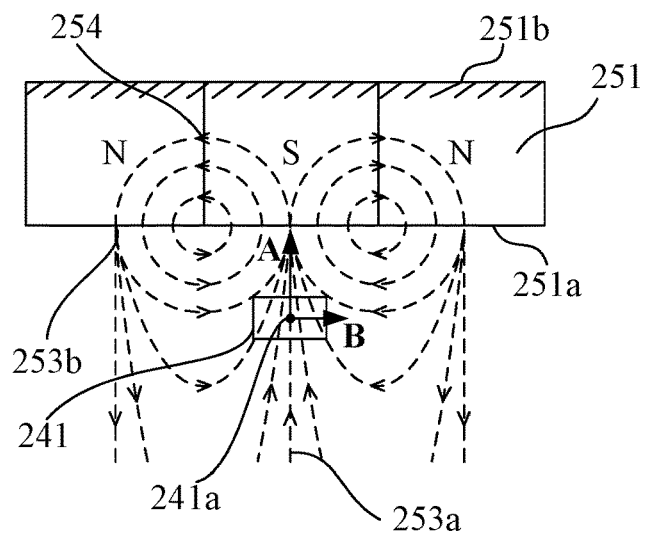
Figure 6D:
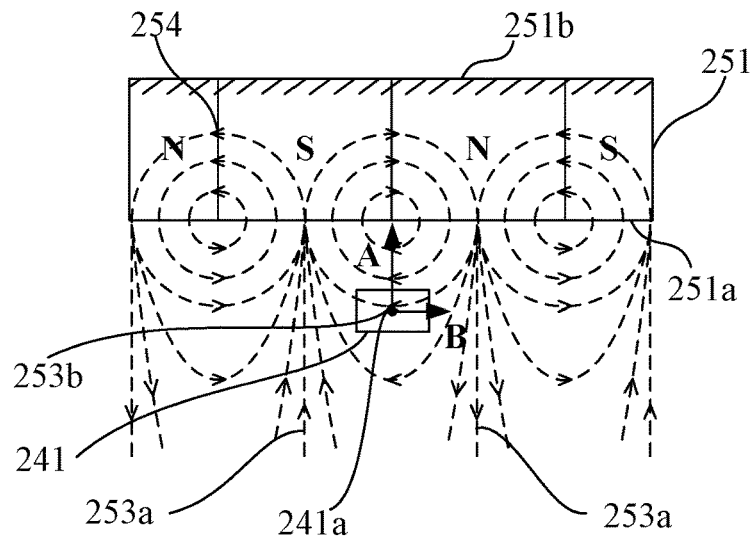

FIGS. 6C and 6D are enlarged views around the Hall IC 241 viewed from the direction orthogonal to the dial rotation axis (the arrow C direction in FIG. 6A) where the positioner 252 does not coincide with the phase of the Hall IC 241. FIG. 6C illustrates a state in which the detector 241a of the Hall IC 241 and the center of the S pole is located on the arrow A. FIG. 6D illustrates a state in which the magnet 251 rotates around the dial rotation axis from the state in FIG. 6C, and the detector 241a in the Hall IC 241 and the boundary between the S pole and N pole are located on the arrow A.

Figure 6E:
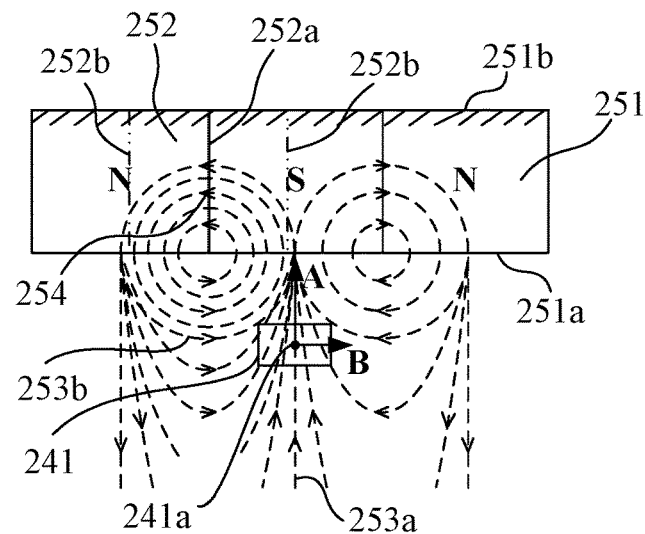
Figure 6F:
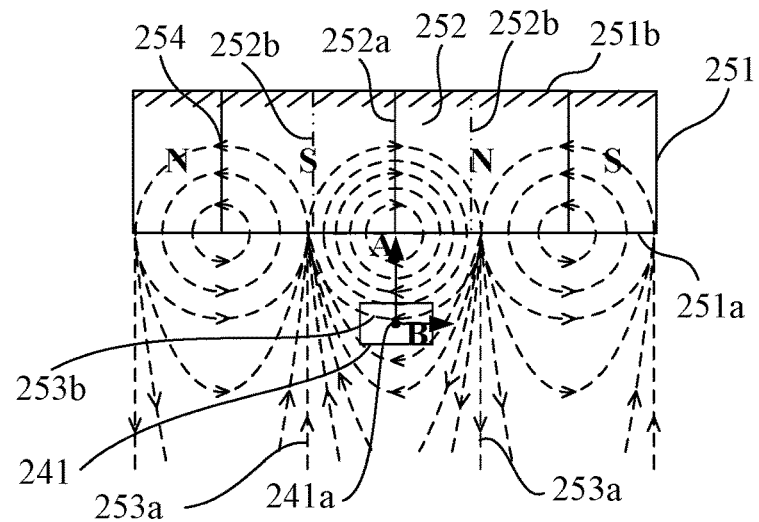

FIG. 6E is an enlarged view around the Hall IC 241 when the magnet 251 is viewed from the direction (arrow C direction) orthogonal to the dial rotation axis where the positioner 252 shifts by half a pitch from the phase of the Hall IC 241. FIG. 6F is an enlarged view around the Hall IC 241 when the magnet 251 is viewed from the direction (arrow C direction) perpendicular to the dial rotation axis where the positioner 252 coincides with the phase of the Hall IC 241.

The magnet 251 is magnetized so as to have a polar anisotropic orientation. In other words, the magnetic field direction inside the magnet 251 does not become a straight line perpendicular to the magnetized surface 251a. An inter-magnet magnetic field 254 rises vertically from the S pole of the magnetized surface 251a, draws an arc toward the N pole, and again becomes a vertical direction at the N pole of the magnetized surface 251a. On the other hand, in the extra-magnet magnetic field, the magnetic flux rising vertically from the N pole draws an arc toward the S pole. Now the magnetic field in the arrow A direction (first direction) in FIG. 6A is defined as a longitudinal magnetic field 253a, and the magnetic field in the arrow B direction (second direction) in FIG. 6A is defined as a transverse magnetic field 253b.

In the state of FIG. 6C, the detector 241a of the Hall IC 241 detects the longitudinal magnetic field 253a and does not detect the transverse magnetic field 253b. On the other hand, in the state of FIG. 6D, the detector 241a detects the transverse magnetic field 253b and does not detect the longitudinal magnetic field 253a. In an intermediate state from FIG. 6C to FIG. 6D, the detector 241a detects the longitudinal magnetic field 253a and the transverse magnetic field 253b based on the intensities corresponding to the rotation state. In other words, FIG. 6C illustrates the state in which the longitudinal magnetic field 253a is maximum and the transverse magnetic field 253b is zero, and FIG. 6D illustrates the state where the longitudinal magnetic field 253a is zero and the transverse magnetic field 253b is maximum. When the magnet 251 is rotated around the dial rotation axis, each of the longitudinal magnetic field 253a and the transverse magnetic field 253b detected by the detector 241a in the Hall IC 241 has a value corresponding to the rotational state between zero and the maximum value.

An alternate long and two short dashes line illustrated in FIGS. 6E and 6F represents the positioner 252 located on the opposite side when the magnet 251 is viewed from the arrow C direction. The vertex 252a of the positioner 252 is located at the boundary between the N pole and the S pole of the magnet 251 and an end point 252b of the positioner 252 is located at each of the N pole and the S pole adjacent to this boundary. In the phase in which the positioner 252 is provided, the area of the magnetized surface 251a of each of the N pole and the S pole increases from the vertex 252a to the end point 252b, and the magnetic field becomes relatively strong formed with respect to the other phase where the positioner 252 is not provided. The magnitude of this magnetic field is represented by the thickness and the number of dotted lines in FIGS. 6E and 6F. In the phase of FIG. 6E, the transverse magnetic field 253b formed by the S pole and the N pole on the side of the positioner 252 becomes stronger than the transverse magnetic field 253b formed by the N pole and the S pole next to them by one pitch. Similar to the phase of FIG. 6F, the transverse magnetic field 253b on the side of the positioner 252 becomes stronger.

As described above, the positioner 252 provided to the magnet 251 increases the area of the magnetized surface 251a around the phase of the positioner 252, and changes the magnitudes of the longitudinal and transverse magnetic fields generated from the magnetized surface 251a for each phase of the magnet 251. While this embodiment provides the vertex 252a of the positioner 252 to the boundary between the N pole and the S pole of the magnet 251, the intensity of the magnetic field changes for each phase of the magnet 251 even when the vertex 252a is provided at the center of the N pole or the S pole. This change amount will be described later.

Figures 7A, 7B:
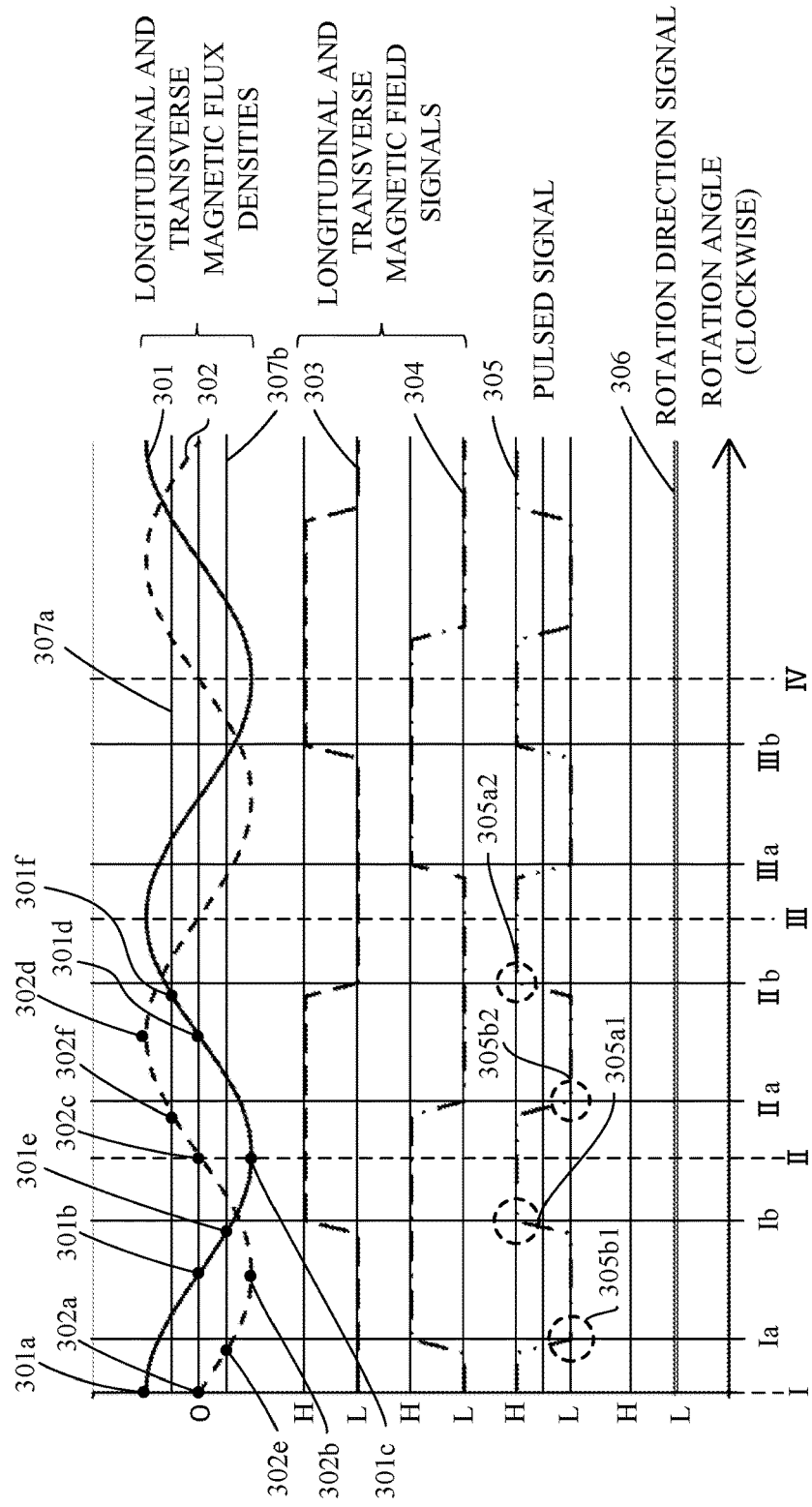
FIGS. 7A and 7B illustrate a relationship between a change in a magnetic field and an output signal from the Hall IC according to the first embodiment.

Referring now to FIGS. 7A and 7B, a description will be given of a relationship between a magnetic field change in the dial rotation and an output signal from the Hall IC 241. FIGS. 7A and 7B illustrate the relationship between the magnetic field change and the output signal from the Hall IC. FIG. 7A is a graph representing the relationship between the intensity of each of the longitudinal magnetic field and the transverse magnetic field and the output from the Hall IC 241 configured to detect it. In FIG. 7A, an abscissa axis represents a rotation angle of the rotational operation member 201, and an ordinate axis represents a magnetic field intensity or a signal output value. FIG. 7A illustrates the magnet 251 having no positioner 252 for comparison purposes as described later.

As described above, the rotational operation unit 200 according to this embodiment has a click mechanism including the undulated portion 230f, the ball member 211, and the spring member 212, and the rotational operation member 201 is rotated every click as a basic unit. I to IV illustrated in the abscissa axis in FIG. 7A represent click positions, and an angle between them corresponds to one click (single click). At the click positions indicated by I to IV, the ball member 211 contacts a concave portion 230g.

The longitudinal and transverse magnetic flux densities (longitudinal magnetic flux density 301 and transverse magnetic flux density 302) are illustrated at the top of the graph in FIG. 7A. The longitudinal magnetic flux density 301 represents the magnetic flux density of the longitudinal magnetic field 253a (see FIG. 6C) of the magnetic field detected by the Hall IC 241. The transverse magnetic flux density 302 represents the magnetic flux density of the transverse magnetic field 253b of the magnetic field detected by the Hall IC 241. Herein, it is assumed that the rotational operation member 201 is rotated in a clockwise direction at a constant speed, and as understood from FIG. 6A, each magnetic flux density periodically changes between a maximum value and a minimum value around the zero as a center. In the state with the rotation angle I, the longitudinal magnetic flux density 301 has a maximum value as in the state 301a. In the same state (state 302a), the transverse magnetic flux density 302 is zero. This means, as illustrated in FIG. 6C, that the magnetic field detected by the Hall IC 241 is only the component in the arrow A direction and there is no component in the arrow B direction.

When the rotational operation member 201 rotates from this state to the state 301b, the longitudinal magnetic flux density 301 becomes zero and the transverse magnetic flux density 302 has the minimum value in the same state (state 302b). This means that the magnetic field detected by the Hall IC 241 does not contain the component in the arrow A direction but contains only the component in the arrow B direction with the direction opposite to the arrow B, as illustrated in FIG. 6D.

When the rotational operation member 201 rotates to the states 301c and 302c, as illustrated in FIG. 6E, the magnetic field detected by the Hall IC 241 has only a component in the direction opposite to the arrow A and does not have any components in the arrow B direction. This state corresponds to a rotation of the rotational operation member 201 by one click from the rotation angle I to the rotation angle II. When the state moves to the states 301d and 302d, as illustrated in FIG. 6F, there is no component in the arrow A direction and only the component in the arrow B direction is detected by the Hall IC 241.

In the four states in FIGS. 6C to 6F, each of the longitudinal magnetic flux density 301 and the transverse magnetic flux density 302 respectively has a value corresponding to the rotation angle of the rotational operation member 201. As described above, when the rotational operation member 201 moves by one click, the magnet 251 rotates by one magnetic pole and each of the longitudinal magnetic flux density 301 and the transverse magnetic flux density 302 changes by half a period. Although the longitudinal magnetic flux density 301 and the transverse magnetic flux density 302 change by half the period, they are periodic signals shifted by the magnetization pitch. Detecting the order and the number of times of the maximum values of these two signals can provide the rotation amount and the rotation direction of the rotational operation member 201.

Next follows a description of the output signal from the Hall IC 241. An upper threshold value 307a and a lower threshold value 307b of the Hall IC 241 are shown so as to overlap the graphs of the longitudinal magnetic flux density 301 and the transverse magnetic flux density 302. The Hall IC 241 regularly samples the magnetic flux passing the detector 241a. When the detected longitudinal and transverse magnetic flux densities are larger than the upper threshold value 307a or smaller than the lower threshold value 307b, the Hall IC 241 changes the longitudinal and transverse magnetic field signals (the longitudinal magnetic field signal 303 and the transverse magnetic field signal 304). A pulsed signal 305 output from the Hall IC 241 varies as the longitudinal and transverse magnetic field signals change. As the magnet 251 rotates at the constant speed integrally with the rotational operation member 201, the Hall IC 241 outputs rectangular signals or the longitudinal magnetic field signal 303 and the transverse magnetic field signal 304 and having the same period as those of the longitudinal magnetic flux density 301 and the transverse magnetic flux density 302. Due to this configuration, the longitudinal magnetic flux density 301 and the transverse magnetic flux density 302 of the analog waveform have rectangular waves and can be easily processed by the CPU 150.

The lowest rotation direction signal 306 in FIG. 7A is a signal representing the rotation direction of the rotational operation member 201, L means that the rotational operation member 201 rotates clockwise, and H means that the rotational operation member 201 rotates counterclockwise. A generation of the rotation direction signal 306 will be described later in detail.

FIG. 7B is a table showing possible values of the longitudinal magnetic field signal 303 and the transverse magnetic field signal 304. A combination of the respective signals (H, L) can represent four states from state 1 to state 4. For example, the state 1 is set between the rotation angle I and a rotation angle Ia. Since the transverse magnetic field signal 304 varies from the rotation angle Ia to a rotation angle Ib, the state 2 is set. Similarly, the state 3 is set between the rotational angle Ib and a rotational angle IIa, and the state 4 is set between the rotational angle IIa and a rotational angle IIb, and then returns to the state 1 between the rotational angle IIb to a rotational angle Ma. In other words, as the rotational operation member 201 is rotated in the clockwise direction, the combination of the longitudinal magnetic field signal 303 and the transverse magnetic field signal 304 changes in order of the state 1, the state 2, the state 3, the state 4, and the state 1. As will be described in detail later, when the rotational operation member 201 is rotated counterclockwise, the state changes in order of the state 1, the state 4, the state 3, the state 2, and the state 1. Monitoring the changes in the longitudinal magnetic field signal 303 and the transverse magnetic field signal 304 enables the rotation direction of the rotational operation member 201 to be detected. The Hall IC 241 internally performs this processing, and outputs the detected rotation direction as H (counterclockwise) and L (clockwise).

Figure 8:
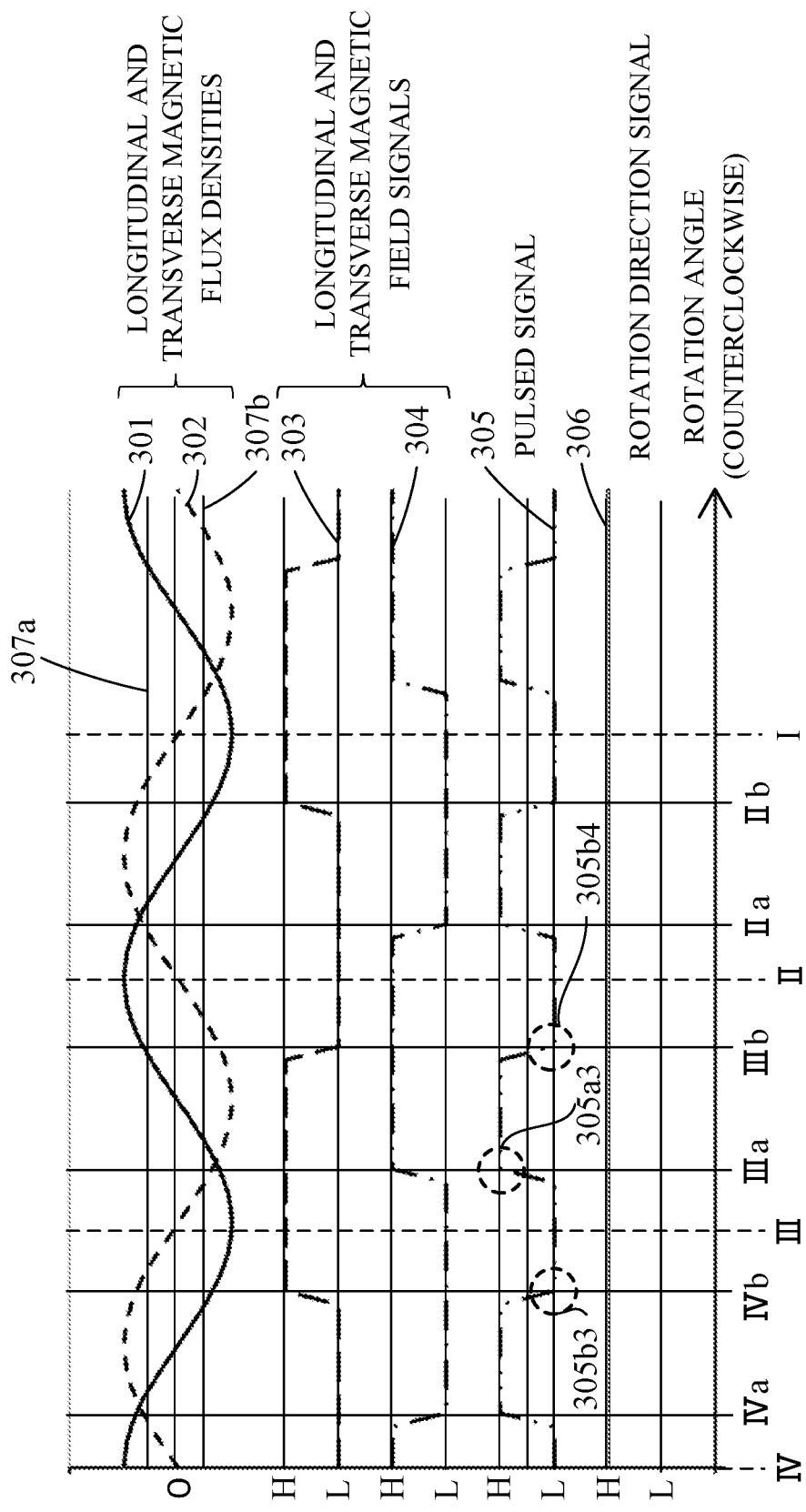
FIG. 8 illustrates a relationship between the change in the magnetic field and the output signal from the Hall IC according to the first embodiment.

Referring now to FIG. 8, a description will be given of signal processing where the rotational operation member 201 is rotated counterclockwise. FIG. 8 illustrates a relationship between the magnetic field change and the output signal from the Hall IC. Those signals in FIG. 8, which are corresponding signals in FIG. 7A, will be designated by the same reference numerals, and a description common to FIG. 7A is omitted.

FIG. 8 illustrates a state in which the rotational operation member 201 that has been rotated clockwise is rotated to a certain arbitrary rotation angle (click positions) IV to I. The processing of generating the longitudinal magnetic field signal 303, the transverse magnetic field signal 304, and the pulsed signal 305 based on the longitudinal magnetic flux density 301 and the transverse magnetic flux density 302 is equivalent with that in the clockwise rotation.

Similar to FIG. 7B, assume a combination state of the longitudinal magnetic field signal 303 and the transverse magnetic field signal 304. The state 2 is set between a rotation angle IV and a rotation angle IVa, because (the vertical magnetic field signal 303 and the transverse magnetic field signal 304) is (L, H). Since (L, L) is set between the rotation angle IVa and a rotation angle IVb, the state 1 is set. Hereinafter, the state 4 is set between the rotation angle IVb and a rotation angle Ma, the state 3 is set between the rotation angle Ma and a rotation angle Mb, and the state 2 is set between the rotation angle Mb and the rotation angle IIa. In other words, as the rotational operation member 201 rotates, the state changes in order of the state 2, the state 1, the state 4, the state 3, and the state 2. Thereby, as described above, it is understood that the rotational operation member 201 is rotated counterclockwise, so that the Hall IC 241 outputs H (counterclockwise) as the rotation direction signal 306.

Figure 9A:
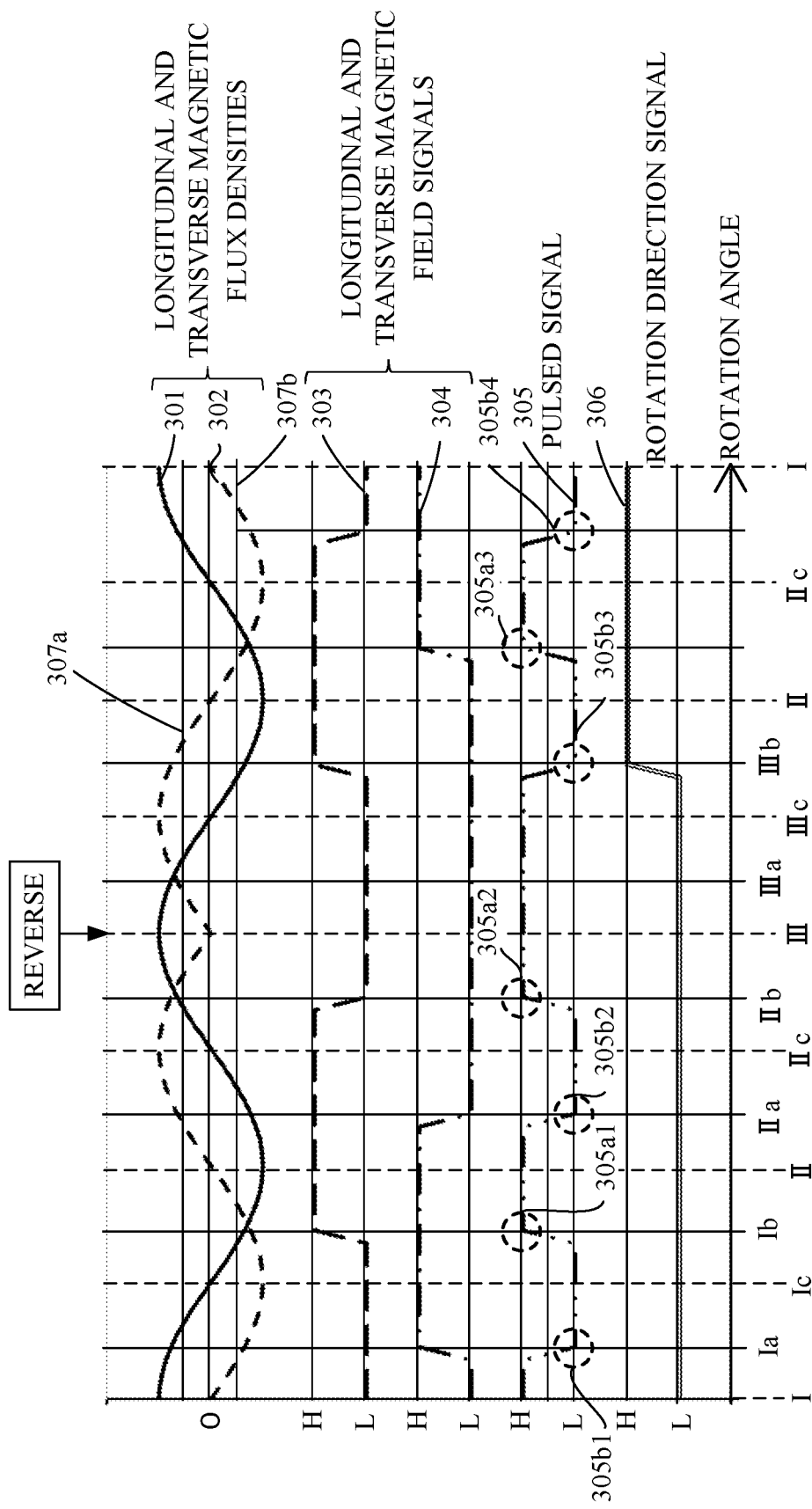
FIGS. 9A and 9B are a relationship diagram between the change of the magnetic field and the output signal from the Hall IC and a flowchart of rotation detecting processing according to the first embodiment.
Figure 9B:
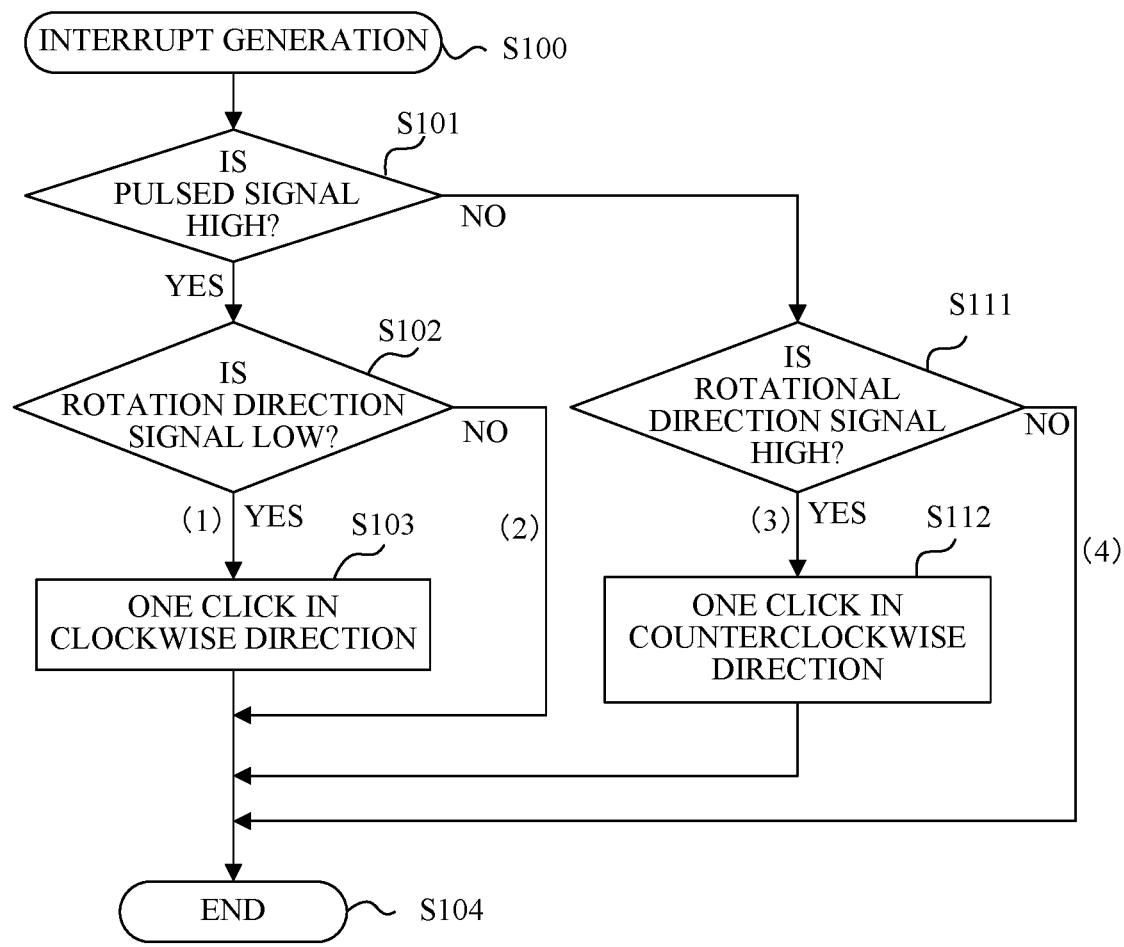

Referring now to FIGS. 9A and 9B, a description will be given of a signal processing method for controlling a rotation detection of the rotational operation member 201 based on the pulsed signal 305 and the rotation direction signal 306. FIG. 9A illustrates the relationship between the magnetic field change and the output signal from the Hall IC. FIG. 9A illustrates the longitudinal and transverse flux densities and a variety of signals when the rotational operation member 201 is rotated to the rotation angle III in the clockwise direction from the angle I by two clicks, then rotated in the counterclockwise direction by two clicks, and returned to the angle I.

FIG. 9B is a flowchart illustrating rotation detection processing performed by the CPU 150 based on the pulsed signal 305 and the rotation direction signal 306. Depending on the output of the rotation direction signal 306, the signal processing according to this embodiment switches which one of the leading edge and the trailing edge of the pulsed signal 305 is used. More specifically, when the rotation direction signal 306 is L (clockwise), the rotational operation member 201 is rotated at the timings of the leading edges (305a1, 305a2, and 305a3) illustrated in FIG. 9A. On the other hand, when the rotation direction signal 306 is H (counterclockwise), the rotation processing is performed at the timings of the trailing edges (305b1, 305b2, 305b3, and 305b4). A description will now be given along the rotation angle in FIG. 9A.

When the rotational operation member 201 is moved clockwise by one click from the rotation angle I to the rotation angle II, the rotation direction signal 306 is L representing clockwise. Hence, nothing happens at the timing of the trailing edge 305b1 of the pulsed signal 305. The rotational operation member 201 rotating from this state exceeds the convex portion 230h of the undulated portion 230f at a rotation angle Ic. When the rotational operation member 201 continues to rotate and reaches the leading edge 305a1 of the pulsed signal 305, the CPU 150 determines that the rotational operation member 201 has rotated by one click and performs a predetermined operation such as a setting change of the imaging apparatus 100. When the ball member 211 again rotates to the state of the rotation angle II and contacts the concave portion 230g, the operation for one click ends. Similar processing is performed for the operation for one click from the rotation angle II to the rotation angle III.

Next follows a description where the rotational operation member 201 is reversed counterclockwise at the rotation angle III. As described above, when the user performs the dialing operation, an operation for each one click is basic. It is thus conceivable that the reversing operation from the click position as indicated by the rotation angle III is frequently used. At this time, the longitudinal magnetic flux density 301 and the transverse magnetic flux density 302 have symmetrical waveforms with respect to the rotation angle III. None of the leading edge and the trailing edge appear in the pulsed signal 305 in one click from the rotation angle III to the rotation angle II until the angle reaches the rotation angle IIIc for going beyond the projection 230h of the undulated portion 230f. This is because the transverse flux density 302 does not fall below the lower threshold value 307b and the transverse magnetic field signal 304 does not change.

After the angle passes the rotation angle IIIc and the longitudinal magnetic flux density 301 becomes lower than the lower threshold value 307b, the longitudinal magnetic field signal 303 changes from L to H in sampling the rotation angle IIIb and the trailing edge 305b3 appears in the pulsed signal 305. Since the combination state of the longitudinal magnetic field signal 303 and the transverse magnetic field signal 304 changes at the same timing, the rotation direction signal 306 also changes from L to H.

When the rotation direction signal 306 is H, the rotation processing is performed at the trailing edge of the pulsed signal 305 and the CPU 150 recognizing the trailing edge 305b3 performs the rotation processing. When the angle reaches the rotation angle II at which the ball member 211 contacts the concave portion 230g, reversing by the first click in the counterclockwise direction ends. The same processing is performed for one click in the counterclockwise direction from the rotation angle II to the rotation angle I.

When the control is made to use only the leading edge of the pulsed signal 305 as in the clockwise direction in the process from the rotation angle III to the rotation angle II, no leading edge exists between the rotation angle III and the rotation angle II. Therefore, the CPU 150 cannot recognize the rotational operation. That is, the rotation at the first click in the reverse operation is not detected and the rotational operation intended by the user is not executed. As shown by the leading edge 305a3, the leading edge in the counterclockwise rotation appears between the rotation angle II and the rotation angle IIc.

Next, assume that the user operates the rotational operation member 201. The state in which the rotational operation member 201 is rotated against the biasing force of the spring member 212 (for example, from the rotation angle II to the rotation angle IIc) and the state in which the ball 211 goes over the convex portion 230h and the dial is forced in the rotation direction by the biasing force of the spring (for example, from the rotation angle IIc to the rotation angle III) are repeated. Thus, the edge of the signal for generating the rotational operation by one click may be generated after the rotational operation member 201 is intentionally rotated by the user and the ball member 211 goes over the convex portion 230h, or between the rotation angle IIc and the rotation angle III. This is because the rotation processing between the rotation angles II and IIc as described above may cause the rotational operation to be performed by the user at an unexpected timing due to the unsteady rotational operation member 201 or the like.

In a configuration that always detects only one of the leading edge and the trailing edge, the edge of the pulsed signal 305 appears before the ball member 211 goes over the convex portion 230h in either the clockwise direction or the counterclockwise direction. Therefore, the control of detecting the rotation cannot be realized after the ball member 211 goes over the convex portion 230h. The switching control of the edge to be used in the pulsed signal 305 can prevent the malfunction at the first click in the reverse operation in accordance with the value of the rotation direction signal 306 as described above. In addition, since the rotation can be detected after the ball member 211 goes over the convex portion 230h regardless of the rotation direction, a rotational operation member that faithfully responds to the intention of the user can be provided with few malfunctions. The above control can prevent the malfunction and perform the rotational operation that reflects the intention of the user even when the reverse operation is performed while the ball member 211 is going over the convex portion 230h.

Referring now to FIG. 9B, a description will be given of the above control. Each step in FIG. 9B is mainly executed by the CPU 150. First, in the step S100, when the leading edge and the trailing edge in the pulsed signal 305 are generated, an interrupt is generated in the CPU 150.

Next, in the step S101, the CPU 150 determines whether the pulsed signal 305 is H (High). When the pulsed signal 305 is H, the flow proceeds to the step S102. In the step S102, the CPU 150 determines whether the rotation direction signal 306 is L (Low). When the rotation direction signal 306 is L, the flow proceeds to the step S103. In the step S103, the rotational operation member 201 rotates clockwise by one click. In the step S104, the interrupt processing ends. On the other hand, when the rotation direction signal 306 is not L (when the rotation direction signal 306 is H) in the step S102, the CPU 150 does not perform any processing, proceeds to the step S104, and ends the interrupt processing.

In the step S101, when the pulsed signal 305 is not H (or when the pulsed signal 305 is L), the flow proceeds to the step S111. In the step S111, the CPU 150 determines whether the rotation direction signal 306 is H (High). If the rotation direction signal 306 is H, the flow proceeds to the step S112. The step S112 rotates the rotational operation member 201 by one click counterclockwise. The step S104 ends the interrupt processing. On the other hand, when the rotation direction signal 306 is not H (or when the rotation direction signal 306 is L) in the step S111, the CPU 150 does not perform any processing, proceeds to the step S104, and ends the interrupt processing.

The flowchart in FIG. 9B is compared to the signal waveform in FIG. 9A as follows. In the interrupt generated at the trailing edge 305b1, the flow becomes no in the step S101 and no in the step S111, and executes no processing through a route (4) in FIG. 9B. In the interrupt in the leading edge 305a1, the flow becomes yes in the step S101 and yes in the step S102, and executes the rotation processing by one click in the clockwise direction through a route (1). In the interrupt of the trailing edge 305b3, the flow becomes no in the step S101 and yes in the step S111, and executes processing by one click in the counterclockwise direction through a route (3). In the interrupt of the leading edge 305a3, the flow becomes yes in the step S101 and no in the step S102, and executes no processing through a route (2). As described above, the processing according to the flowchart in FIG. 9B can perform a rotation detection control that reflects the intention of the user without causing any malfunctions regardless of the rotation direction of the rotational operation member 201.

Figure 10A:
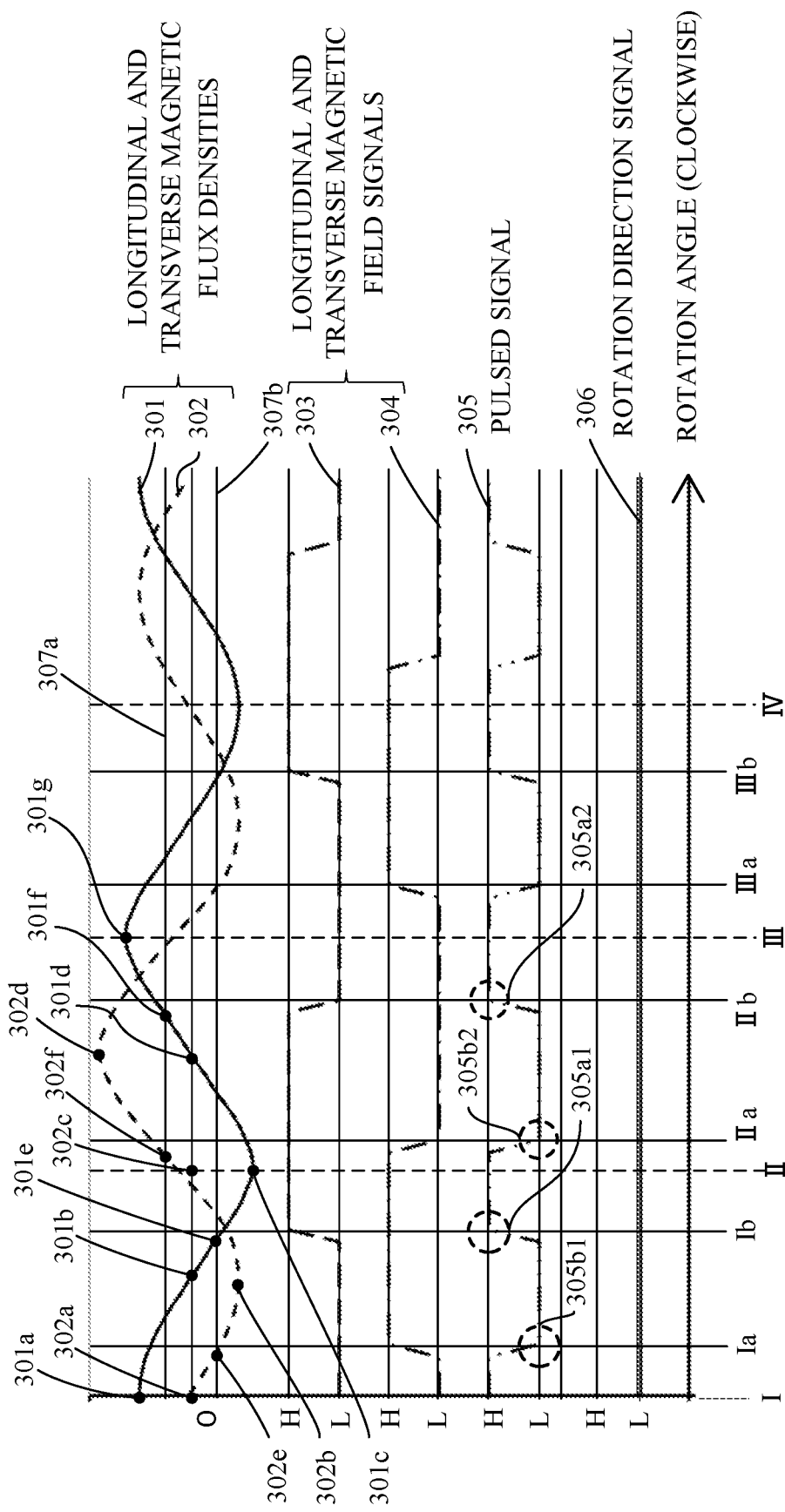
FIGS. 10A and 10B illustrate a relationship between the change of the magnetic field and the output signal from the Hall IC according to the first embodiment.
Figure 10B:
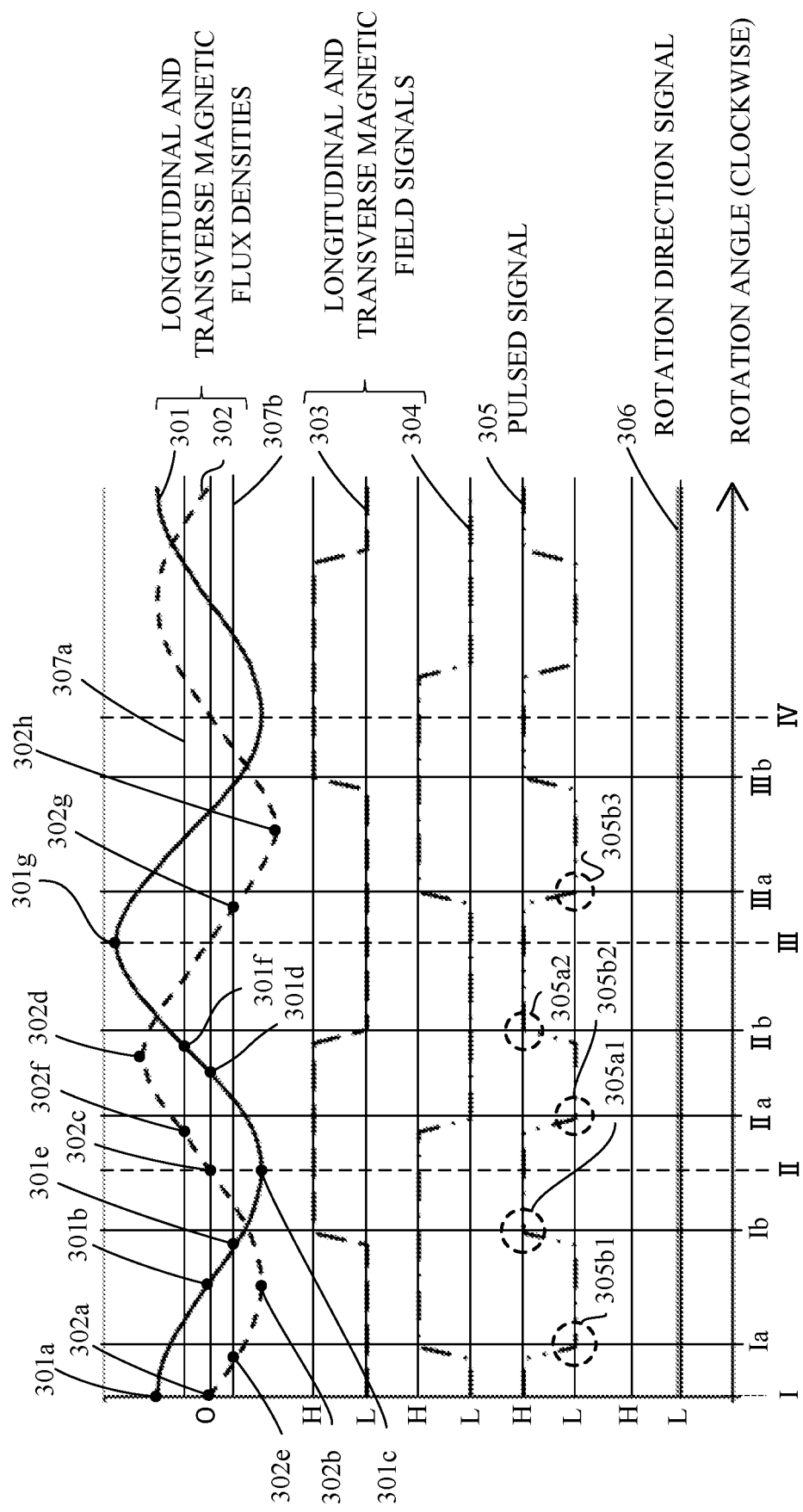

Referring now to FIGS. 10A and 10B, a description will be given of a magnetic field change in the dial rotation and the influence on the output signal from the Hall IC 241 when the magnet 251 has the positioner 252. FIG. 10A is a graph showing the relationship between the intensities of the longitudinal and transverse magnetic fields and the output signal from the Hall IC 241 that detects them when the positioner 252 is provided between the N pole and the S pole. The rotation angle I to the rotation angle IV illustrated in FIG. 10A correspond to the rotation angle (phase) illustrated in FIG. 6A. FIG. 10B is a graph illustrating the relationship between the intensities of the longitudinal and transverse magnetic fields and the output signal from the Hall IC 241 that detect them when the positioner 252 is provided at the center of the N pole or the S pole (not illustrated). A description will be given of the positioner 252 provided at the center of the N pole. The rotation angle I to the rotation angle IV illustrated in FIG. 10B correspond to the rotation angle (phase) illustrated in FIG. 6A.

In the graph illustrated in FIG. 10A, as the magnet 251 is rotated clockwise from the rotation angle I, the peak value of the transverse magnetic flux density 302 becomes larger in the phase state 302d of the positioner 252. The peak value of the longitudinal magnetic flux density 301 in each of the adjacent phase states 301c and 301g also become larger relative to the phase of the positioner 252. Hence, the necessary rotation angle becomes smaller until the transverse magnetic flux density 302 reaches the point 302f beyond the upper threshold value 307a, and the timing of the trailing edge 305b2 becomes earlier. The necessary rotation angle becomes smaller until the longitudinal magnetic flux density 301 reaches the state 301e beyond the lower threshold value 307b and the state 301f beyond the upper threshold value 307a, and the timings of the leading edge 305a1 and the leading edge 305a2 become earlier.

In the graph illustrated in FIG. 10B, as the magnet 251 is rotated clockwise from the rotation angle I, the peak value of the longitudinal magnetic flux density 301 increases in the phase state 301g of the positioner 252. The peak value of the transverse flux density 302 illustrated in the adjacent phase states 302f and 302g also increases relative to the phase of the positioner 252. Hence, the necessary rotation angle decreases until the longitudinal magnetic flux density 301 reaches the state 301f beyond the upper threshold value 307a, and the timing of the trailing edge 305a2 becomes earlier. The necessary rotation angle decreases until the transverse magnetic flux density 302 reaches the state 302f beyond the upper threshold value 307a and the state 302g beyond the lower threshold value 307b, and the timings of the leading edge 305a1 and the trailing edge 305b3 become earlier.

As described above, the waveforms of the longitudinal and transverse magnetic fields detected by the Hall IC 241 change around the phase where the positioner 252 is provided to the magnet 251. Therefore, a difference occurs between the rotation amount at which the click sense is generated by the magnet holding member 230 and the ball member 211 and the rotation amount detected by the Hall IC 241. This difference causes the timing of the rotation detection of the rotational operation member 201 to shift from the timing when the click sense occurs, and may impair the dial operability. The operability of a rotational operation member without a click sense may deteriorate, as in the focus ring 14 in the imaging lens 13 illustrated in FIGS. 1A and 1B, when the rotation amount of the rotational operation member and the timing of the rotation detection shift from each other.

Referring now to FIGS. 11A and 11D, a description will be given of a method of reducing the influence of the positioner 252 on the longitudinal and transverse magnetic flux densities. FIG. 11A is a top view of the magnet 251 in which a magnet positioning surface 252c for the positioner 252 is provided on the same surface as the magnetized surface 251a. FIG. 11B is a sectional view passing the positioner 252 in FIG. 11A. FIG. 11C is a top view of the magnet 251 when the magnet positioning surface 252c of the positioner 252 is not provided on the same surface as the magnetized surface 251a. FIG. 11D is a sectional view passing the positioner 252 in FIG. 11C.

As illustrated in FIGS. 11A and 11B, when the magnet positioning surface 252c is provided on the same plane as the magnetized surface 251a facing the Hall IC 241, the area of the magnetized surface 251a opposed to the Hall IC 241 increases by the area of the magnet positioning surface 252c. In this case, the magnetic field near the phase of the positioner 252 becomes stronger as in the graphs illustrated in FIGS. 10A and 10B.

As illustrated in FIGS. 11C and 11D, when the magnet positioning surface 252c has a step that separates from the Hall IC 241 relative to the magnetized surface 251a facing the Hall IC 241, the area of the magnetized surface 251a facing the Hall IC 241 does not change for each phase. At this time, since the generation sources of the magnetic fields generated from the magnetized surface 251a and the magnet positioning surface 252c are different from each other, it is possible to reduce the increase of the magnetic field near the phase of the positioning portion 252 can be made smaller than that in configurations in FIGS. 11A and 11B. Hence, this configuration can reduce the influence of the longitudinal and transverse magnetic fields generated from the magnet positioning surface 252c among the longitudinal and transverse magnetic flux densities detected by the Hall IC 241. As the magnet positioning surface 252c separates from the Hall IC 241 with respect to the magnetized surface 251a, the influence of the longitudinal and transverse magnetic flux densities detected by the Hall IC 241 on the waveform can be reduced.

In this embodiment, the step between the magnetized surface 251a and the magnet positioning surface 252c corresponds to a distance of about 15% of the thickness of the magnet 251. As illustrated in FIG. 11D, the magnet positioning surface 252c may have a symmetrical shape with respect to the magnet 251 in the arrow A direction. According to the configuration illustrated in FIGS. 11A to 11D, the positioner 252 inside the magnet 251 suppresses the increase in the outer diameter of the magnet 251 and prevents the increase in the outer diameter of the rotational operation member 201.

Referring now to FIGS. 12A to 12D, a description will be given of an illustrative shape of the positioner 252 in the magnet 251. FIGS. 12A to 12D illustrate the magnet 251 where a plurality of positioners 252 provided inside the magnet 251 have a concave shape relative to the magnet 251. FIG. 12A is a top view of the magnet 251 when the positioner 252 is as thick as the magnet 251. In this case, the area of the magnetized surface 251a decreases by the area of the magnet positioning surface 252c. FIG. 12B is a sectional view passing the positioner 252 in FIG. 12A. FIG. 12C is a top view of the magnet 251 when the positioner 252 has a thickness different from that of the magnet 251 and the area of the magnetized surface 251a is not decreased by the magnet positioning surface 252c. FIG. 12D is a sectional view passing the positioner 252 in FIG. 12C.

As illustrated in FIGS. 12A and 12B, when the area of the magnetized surface 251a decreases around the phase of the positioner 252, the magnetic field generated from the magnetized surface 251a decreases. In addition, the respective peak values (states 302d, 302h, 301c, and 301g) of the longitudinal and transverse magnetic flux densities illustrated in FIGS. 10A and 10B become smaller, and the correct rotation amount and the rotation direction may not be detected.

As illustrated in FIGS. 12C and 12D, the configuration where the positioner 252 does not decrease the area of the magnetized surface 251a can prevent the magnetic field near the phase of the positioning portion 252 from being weaker than that in the configurations in FIGS. 12A and 12B. Hence, the influence of the unillustrated longitudinal and transverse magnetic fields generated from the magnet positioning surface 252c on the magnetic flux density detected by the Hall IC 241 can be reduced. The configuration illustrated in FIGS. 12C and 12D can also reduce the influence of the longitudinal and transverse magnetic flux densities detected by the Hall IC 241 on the waveform, similarly to the configuration of FIGS. 11C and 11D, as the magnet positioning surface 252c becomes farther from the magnetized surface 251a.

Thus, this embodiment may provide the positioner 252 at a position different from a position facing the Hall IC 241 in the first direction in the magnet 251. The positioner 252 may be provided at a position shifted from the detection axis (the axis in the first direction) of the Hall IC 241 in the magnet 251. In the first direction, a distance (D1) between the positioner 252 and the Hall IC 241 may be larger than a distance (D2) between the Hall IC 241 and the magnetized surface 251a in the magnet 251 facing the Hall IC 241 (D1>D2).

It is also conceivable that the positioner 252 may be integrated with the magnet 251 by a manufacturing method such as two-color molding as a separate member from the magnet 251, but the configuration according to this embodiment can reduce the component cost by providing the positioner 252 to the magnet 251. The configuration according to this embodiment can accurately position the magnet 251 and the magnet holding member 230 and reduce the accuracy deteriorations of the click sense and rotation detection timing. This embodiment arranges a plurality of the positioners 252 inside the magnet 251, but can obtain similar effects even with a configuration in which the positioner 252 is disposed on the outer circumference of the magnet 251 or a configuration with a single positioner 252.

This embodiment, even in the rotational operation member without any click senses as in the focus ring 14 in the imaging lens 13 illustrated in FIGS. 1A and 1B, can reduce a shift amount between the rotation amount of the rotational operation member and the rotation detection timing and restrain the operability from lowering. While this embodiment has discussed the rotational operation member 201 provided to the back cover 110 on the imaging apparatus 100, the present invention is not limited to this embodiment and is applicable to the rotational operation member like the dial 71 illustrated in FIGS. 1A and 1B.

Second Embodiment

Figure 13:
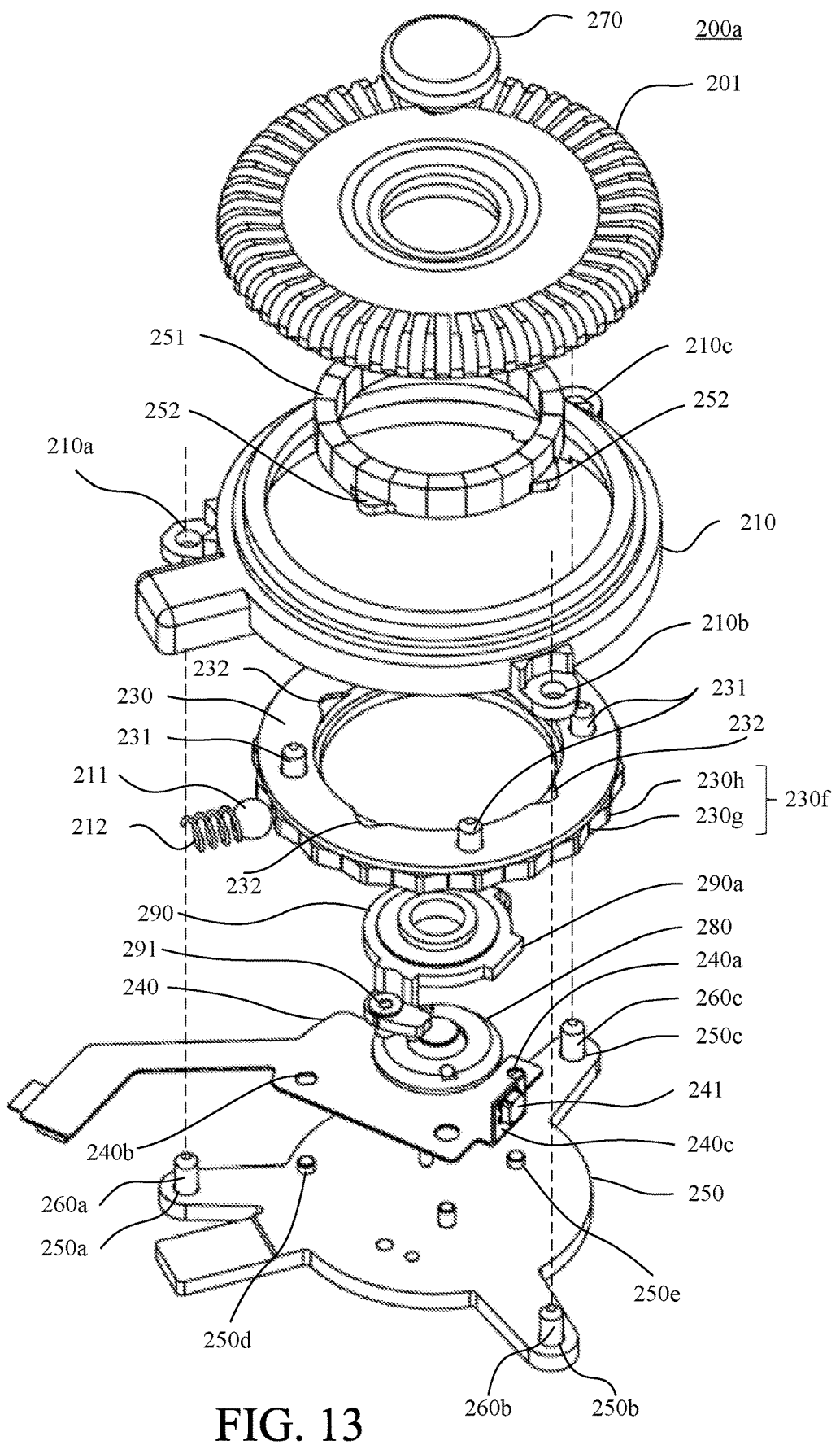
FIG. 13 is an exploded perspective view of a rotational operation unit according to a second embodiment.
Figure 14:
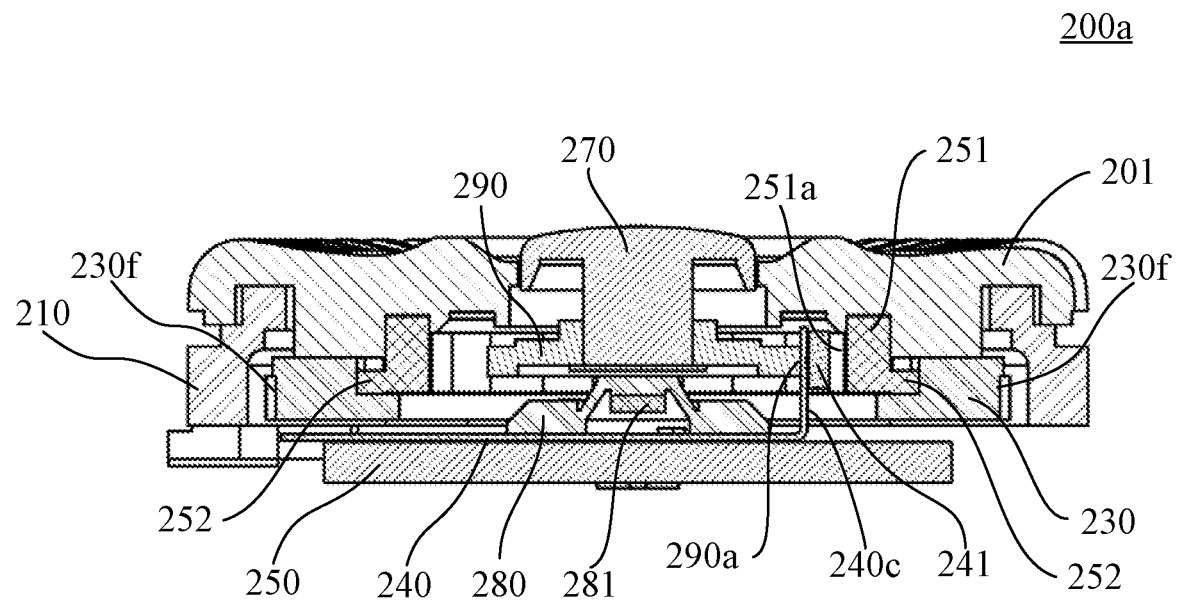
FIG. 14 is a sectional view of the rotational operation unit according to the second embodiment.

Referring now to FIGS. 13 and 14, a description will be given of a second embodiment according to the present invention. Those elements, which are corresponding elements in the first embodiment, will be designated by the same reference numerals, and a detailed description thereof will be omitted. This embodiment is different from the first embodiment in shapes of the magnet 251 and the positioner 252, in arrangement of the Hall IC 241, in presence of a substrate holding member 290, and the like. The other basic configuration of this embodiment is the same as that of the first embodiment. Those elements, which are corresponding elements in the first embodiment, will be designated by the same reference numerals, and a detailed description thereof will be omitted.

FIG. 13 is an exploded perspective view of a rotational operation unit 200a. In the rotational operation unit 200a, the Hall IC 241 is disposed inside the magnet 251. FIG. 14 is a sectional view of the rotational operation unit 200a, illustrating a section passing the center of the Hall IC 241. For simple description purposes, the section in FIG. 14 passes the vertex of the positioner 252 in the magnet 251.

A substrate bent portion 240c is formed by bending part of the substrate 240. The Hall IC 241 is mounted onto the substrate bent portion 240c. The substrate holding member 290 is fixed onto a substrate fixing plate 250 by screws 291 so as to cover the switch rubber 280 and the substrate 240. The substrate holding member 290 includes a substrate holder portion 290a, and the substrate bent portion 240c is attached. The magnet 251 is fixed by the rotational operation member 201 and the magnet holding member 230, and the magnetized surface 251a is provided on the inner surface of the magnet 251. The Hall IC 241 is disposed at a position facing the magnetized surface 251a inside the magnet 251. The positioner (convex portion) 252 is provided outside the magnet 251 (so as to protrude from the outside) so as to reduce the thickness of the magnet 251.

Referring now to FIGS. 15A to 15F, a description will be given of the magnetic field generated by the magnet 251 and the influence of the positioner 252 on the magnetic field where the Hall IC 241 is disposed inside the magnet 251. FIGS. 15A to 15F illustrate the relationship between the magnet 251 and the Hall IC 241, and the influence on the longitudinal and transverse magnetic fields detected by the Hall IC 241 at the position of the positioner 252.

Figure 15A:
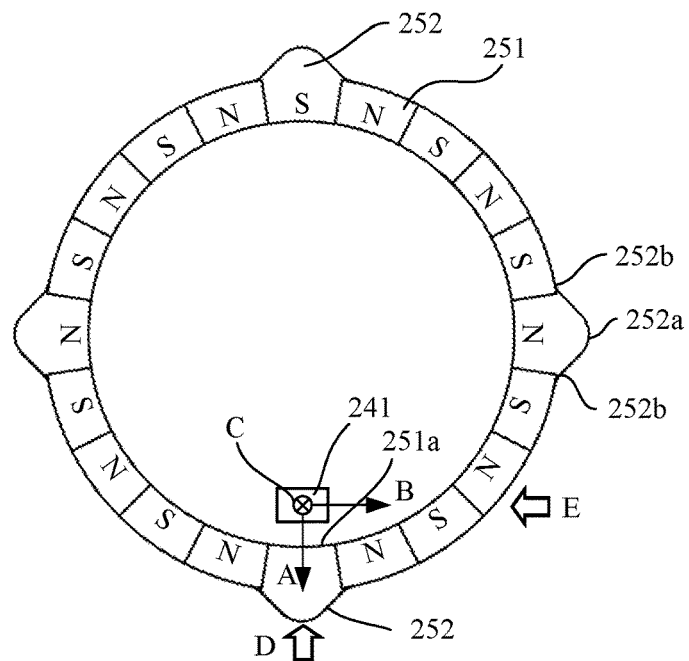
FIGS. 15A to 15F illustrate a relationship between a magnet and a Hall IC according to the second embodiment.
Figure 15B:
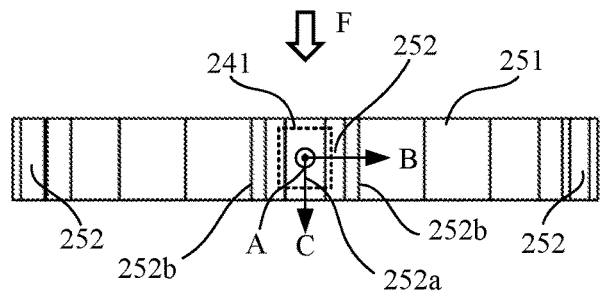
Figure 15C:
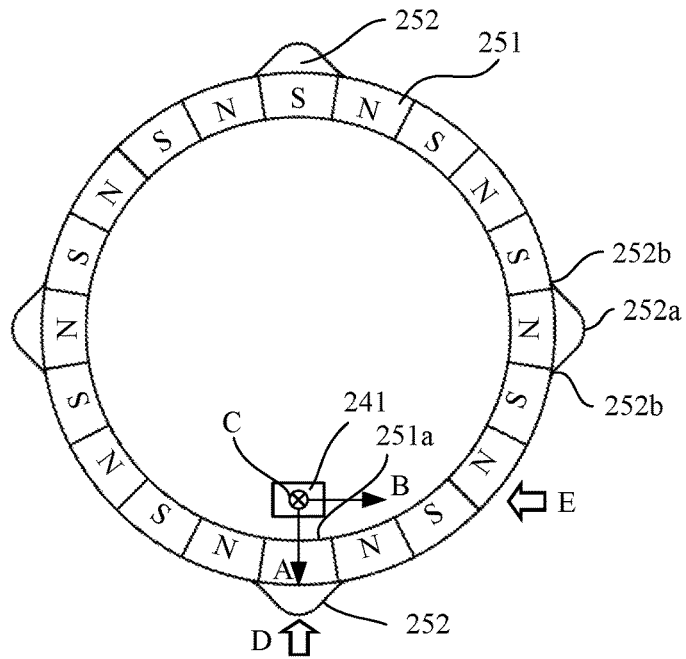
Figure 15D:
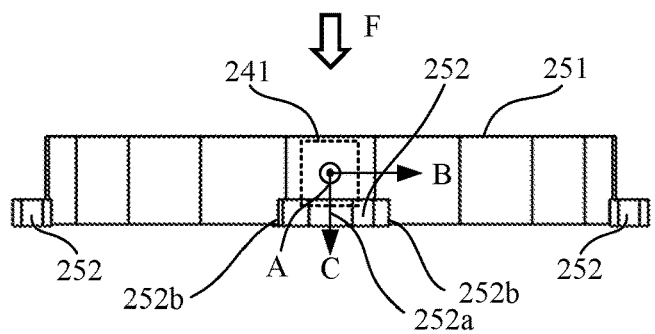
Figure 15E:
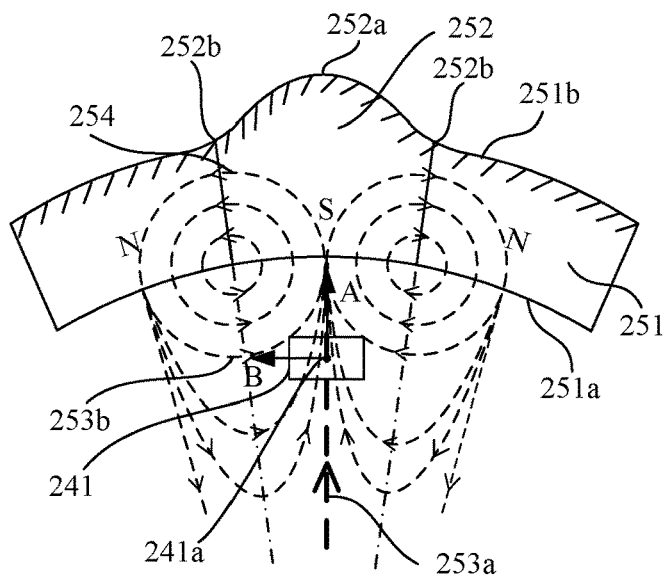
Figure 15F:
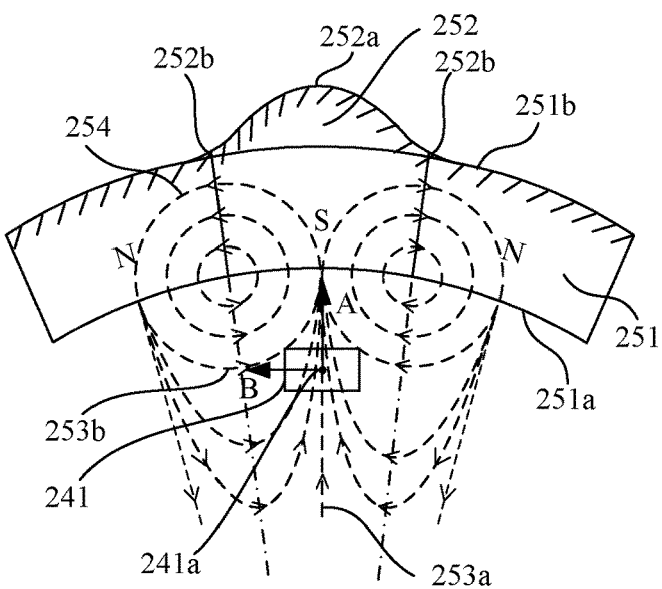

FIGS. 15A and 15B illustrate the magnet 251 viewed from the dial rotation axis direction (the arrow C direction) and the direction perpendicular to the rotation axis (the direction opposite to the arrow A) where the positioner 252 is as thick as the magnet 251. FIGS. 15C and 15D illustrate the magnet 251 viewed from the dial rotation axis direction (the arrow C direction) and the direction perpendicular to the rotation axis (the direction opposite to the arrow A) where the thickness of the positioner 252 is different from that of the magnet 251. FIG. 15E illustrates a state of the longitudinal and transverse magnetic fields around the Hall IC 241 with a phase in which the positioner 252 faces the Hall IC 241, corresponding to FIGS. 12A and 12B. FIG. 15F illustrates a state of the longitudinal and transverse magnetic fields around the Hall IC 241 with a phase in which the positioner 252 faces the Hall IC 241, corresponding to FIGS. 12C and 12D. The positioner vertex 252a of the positioner 252 inside the magnet 251 coincides with the phase of the center portion of the S pole or N pole of the magnet 251. At this time, the positioner 252 coincides with the magnetic poles annularly polarized at regular pitches and is not polarized.

The configuration illustrated in FIGS. 15A and 15B increases a width of the radial direction (the arrow A direction) of the magnet 251 on the detection axis of the Hall IC 241 (axis in the arrow A direction (first direction)), where the positioner 252 overlaps the phase of the Hall IC 241. Hence, the longitudinal magnetic field generated in the vertical direction from the magnetized surface 251*a* becomes stronger, and a difference occurs between the longitudinal and transverse magnetic flux densities detected by the Hall IC 241. The magnitudes of the longitudinal and transverse magnetic fields are indicated by the thickness of the dotted line in FIG. 15E. The difference between the longitudinal and transverse magnetic flux densities shifts the detection timing, as illustrated in FIGS. 10A and 10B, and may not correctly detect the rotation direction and the rotation amount.

In the configuration illustrated in FIGS. 15C and 15D, when the positioner 252 overlaps the phase of the Hall IC 241, the width in the radial direction (the arrow A direction) of the magnet 251 does not increase on the detection axis (the axis in the arrow A direction) of the Hall IC 241. Hence, it is possible to reduce the difference of the longitudinal magnetic field generated in the vertical direction from the magnetized surface 251*a* for each phase of the magnet 251. In other words, since the positioner 252 is not provided on the detection axis (the axis in the arrow A direction) of the Hall IC 241, the influence of the longitudinal and transverse magnetic flux densities detected by the Hall IC 241 on the waveform can be reduced.

The configuration illustrated in FIGS. 15A to 15F provides the Hall IC 241 to the inside of the magnet 251 and the positioner 252 to the outside of the magnet 251, reducing the thickness of the rotational operation member 201. Setting the magnetized surface 251*a* only to the inner surface of the magnet 251 can reduce the magnetic field leaking from the magnet 251 to the outside. In this embodiment, the step between the detection axis of the Hall IC 241*b* and the magnet positioning surface 252*c* corresponds to a distance of about 20% of the thickness of the magnet 251.

Third Embodiment

Figure 16:
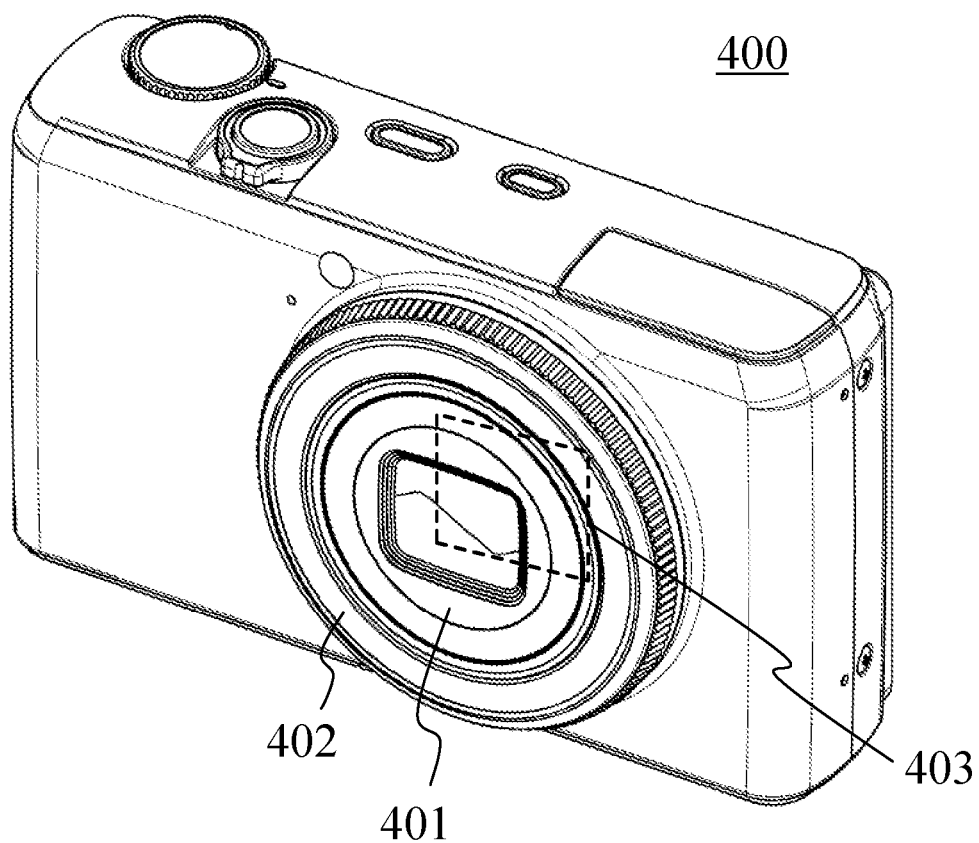
FIG. 16 is an overview of an imaging apparatus according to a third embodiment.

Referring now to FIG. 16, a description will be given of an electronic apparatus (camera) according to a third embodiment of the present invention. FIG. 16 is an overview of a camera (imaging apparatus) 400 according to this embodiment.

In this embodiment, the rotational operation member 201 of each of the above embodiments is a rotation ring 402 disposed around the lens barrel 401, but this embodiment is not limited to this example and may be another rotational operation member in the camera 400. The user can assign an arbitrary function to the rotation ring 402 in the camera 400, and can control each function according to the rotation amount and the rotation direction of the rotation ring 402. The arbitrary function is, for example, a function for assisting imaging.

Similar to the configuration of the rotational operation member 201 described in each embodiment, the magnet 251 is held inside the rotation ring 402 on the side of the rotation ring 402, and the rotation ring 402 and the magnet 251 integrally or associatively rotate. The rotating ring 402 has a click mechanism, and the rotating operation of the rotating ring 402 is performed for each one click as a basic unit. The Hall IC 241 is fixed onto the camera 400 side so as to face the magnet 251. Similar to the configuration of the rotational operation member 201 described in the respective embodiments, the rotation of the rotation ring 402 is detected by making the number of polarizations in the magnet 251 equal to the number of clicks in the rotary ring 402 and by performing the above processing.

The lens barrel 401 includes an imaging optical system. An image sensor 403 photoelectrically converts an object image (optical image) formed via the imaging optical system and outputs image data. In this embodiment, the lens barrel 401 may be detachably attached to the camera body including the image sensor 403 or may be integrally configured. This embodiment discusses the camera 400 as an illustrative electronic apparatus, but the present invention is not limited to this embodiment and is applicable to an electronic apparatus other than the camera.

The above embodiments can provide a reliable rotational operation unit and electronic apparatus by reducing a difference between the timing at which the click sense of the rotational operation member occurs and the detection timing of the rotation direction and the rotation amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-046686, filed on Mar. 14, 2018, which is hereby incorporated by reference herein in its entirety.

What is claimed is:

1. A rotational operation unit comprising:
a rotational operation member that is rotatable;
an annular magnet configured to integrally rotate with the rotational operation member; and
a magnet holding member configured to rotatably hold the magnet and including an undulated portion configured to generate a click sense as the rotational operation member rotates,
wherein the magnet includes a positioner configured to determine a position relative to the magnet holding member.

2. The rotational operation unit according to claim 1, further comprising:
a magnetic field detector configured to detect a magnetic field; and
a calculator configured to calculate a rotation amount and a rotation direction of the rotational operation member as the magnetic field changes,
wherein S poles and N poles are alternately magnetized with a constant pitch in a circumferential direction in the magnet.

3. The rotational operating unit according to claim 2, wherein the magnetic field detector includes:
a first magnetic field detector configured to detect a magnetic field in a first direction; and
a second magnetic field detector configured to detect a magnetic field in a second direction different from a magnetic field in the first direction, and
wherein the calculator calculates the rotation amount and the rotation direction of the rotational operation member based on a change amount in the magnetic field in the first direction and a change amount in the magnetic field in the second direction.

4. The rotational operation unit according to claim 3, wherein the positioner is located at a position different from a position facing the magnetic field detector in the first direction in the magnet.

5. The rotational operation unit according to claim 3, wherein the positioner is located at a position shifted from a detection axis of the magnetic field detector in the magnet.

6. The rotational operation unit according to claim 5, wherein in the first direction, a distance between the positioner and the magnetic field detector is larger than a distance between a magnetized surface of the magnet facing the magnetic field detector and the magnetic field detector.

7. The rotational operation unit according to claim 1, wherein the positioner includes a convex portion protruding to an inside of the annular magnet, the magnet holding member includes a groove portion, and the position of the magnet relative to the magnet holding member is determined based on an engagement between the convex portion and the groove portion.

8. The rotational operation unit according to claim 1, wherein the positioner includes a convex portion protruding to an outside of the annular magnet, the magnet holding member includes a groove portion, and the position of the magnet relative to the magnet holding member is determined based on an engagement between the convex portion and the groove portion.

9. The rotational operation unit according to claim 1, further comprising:
   a ball member held on a base member; and
   a spring member configured to bias the ball member,
   wherein the undulated portion, the ball member, and the spring member form a click mechanism configured to generate the click sense.

10. An electronic apparatus comprising a rotational operation unit that includes a rotational operation member that is rotatable, an annular magnet configured to integrally rotate with the rotational operation member, and a magnet holding member configured to rotatably hold the magnet and including an undulated portion configured to generate a click sense as the rotational operation member rotates, wherein the magnet includes a positioner configured to determine a position relative to the magnet holding member.

* * * * *